(12) United States Patent
Han

(10) Patent No.: US 9,055,573 B2
(45) Date of Patent: Jun. 9, 2015

(54) METHOD AND DEVICE FOR TRANSMITTING CONTROL INFORMATION IN A WIRELESS COMMUNICATION SYSTEM

(75) Inventor: Seunghee Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 169 days.

(21) Appl. No.: 13/814,526

(22) PCT Filed: Aug. 24, 2011

(86) PCT No.: PCT/KR2011/006251
§ 371 (c)(1),
(2), (4) Date: Feb. 6, 2013

(87) PCT Pub. No.: WO2012/030104
PCT Pub. Date: Mar. 8, 2012

(65) Prior Publication Data
US 2013/0136093 A1    May 30, 2013

Related U.S. Application Data

(60) Provisional application No. 61/378,952, filed on Sep. 1, 2010.

(51) Int. Cl.
*H04W 72/04* (2009.01)
*H04B 7/06* (2006.01)
*H04L 5/00* (2006.01)
(Continued)

(52) U.S. Cl.
CPC ......... *H04W 72/0413* (2013.01); *H04B 7/0689* (2013.01); *H04L 5/0053* (2013.01); *H04L 5/0007* (2013.01); *H04L 5/0046* (2013.01); *H04L 27/2636* (2013.01); *H04L 27/32* (2013.01)

(58) Field of Classification Search
None
See application file for complete search history.

(56) References Cited

U.S. PATENT DOCUMENTS

2010/0238984 A1* 9/2010 Sayana et al. .................. 375/219
2010/0271970 A1* 10/2010 Pan et al. ....................... 370/252
2011/0141928 A1* 6/2011 Shin et al. ...................... 370/252
(Continued)

OTHER PUBLICATIONS

LG Electronics Inc., "Transmit Diversity for CA PUCCHs," Agenda Item 6.4.4, 3GPP TSG RAN WG1 #62, R1-104774, Aug. 23-27, 2010, Madrid, Spain, pp. 1-3.
(Continued)

*Primary Examiner* — Chi H Pham
*Assistant Examiner* — Shick Hom
(74) *Attorney, Agent, or Firm* — Birch, Stewart, Kolasch & Birch, LLP

(57) ABSTRACT

The present invention relates to a method for transmitting control information in a wireless communication system, and provides the method for transmitting control information comprising the following steps: selecting from a plurality of physical uplink control channel (PUCCH) resources a PUCCH resource for the control information; and transmitting a modulation value which corresponds to the control information through a plurality of antenna ports, using the selected PUCCH resource, wherein the plurality of PUCCH resources are divided into a first PUCCH resource group comprising pairs and a second PUCCH resource group not comprising pairs, and the control information is transmitted using a first transmission diversity method when the selected PUCCH resource belongs to the first PUCCH resource group, and using a second transmission diversity method when the selected PUCCH resource belongs to the second PUCCH resource group.

10 Claims, 29 Drawing Sheets

(51) Int. Cl.
*H04L 27/26* (2006.01)
*H04L 27/32* (2006.01)

(56) References Cited

U.S. PATENT DOCUMENTS

2011/0170575 A1* 7/2011 Harrison et al. .............. 375/146
2012/0113948 A1* 5/2012 Kwon et al. .................. 370/329

OTHER PUBLICATIONS

Nokia Siemens Networks, "On Transmission Diversity for Multi-A/N Signaling," Agenda Item 6.4.4, 3GPP TSG RAN WG1 Meeting #62, R1-104452, Aug. 23-27, 2010, Madrid, Spain, 4 pages.

Samsung, "Transmit Diversity for PUCCH Formats 2/2a/2b," Agenda Item 6.4.2, 3GPP TSG RAN WG1 #61, R1-103036, May 10-14, 2010, Montreal, Canada, pp. 1-4.

* cited by examiner

FIG. 5
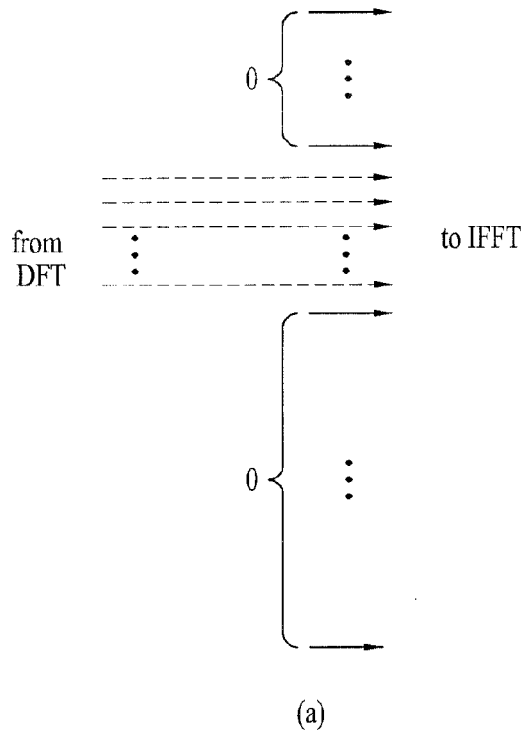
(a)
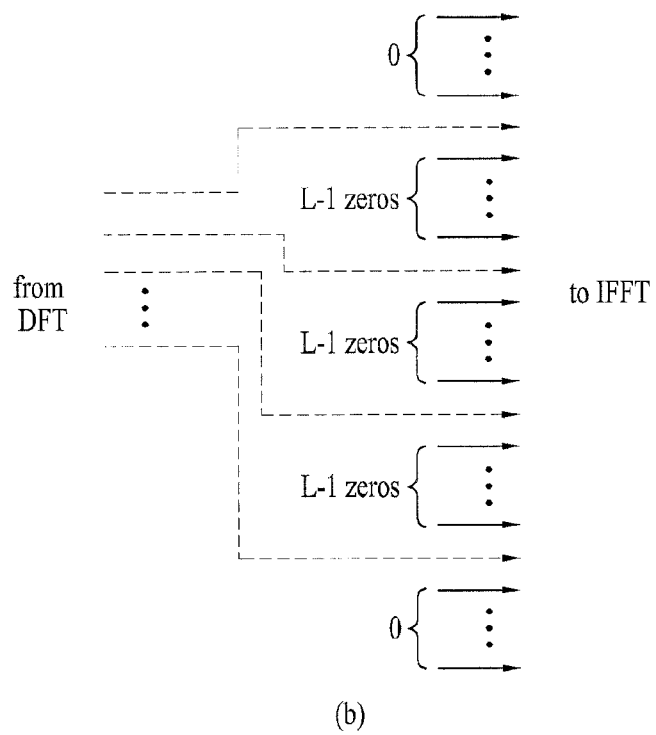
(b)

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

FIG. 17

Resource allocation: 18 ACK/NACK channels with normal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | | | | | | |
| 2 | 1 | n'=0 | 6 | 12 | n'=0 | 6 | 12 |
| 3 | 2 | 1 | 7 | 13 | 1 | 7 | 13 |
| 4 | 3 | 2 | 8 | 14 | 2 | 8 | 14 |
| 5 | 4 | 3 | 9 | 15 | 3 | 9 | 15 |
| 6 | 5 | 4 | 10 | 16 | 4 | 10 | 16 |
| 7 | 6 | 5 | 11 | 17 | 5 | 11 | 17 |
| 8 | 7 | | | | | | |
| 9 | 8 | | | | | | |
| 10 | 9 | | | | | | |
| 11 | 10 | | | | | | |
| 0 | 11 | | | | | | |

$\Delta_{shift}^{PUCCH} = \{1,2,3\}$ for normal cyclic prefix
$\Delta_{shift}^{PUCCH} = \{1,2,3\}$ for extended cyclic prefix
$\delta_{offset}^{PUCCH} \in \{0,1,...,\Delta_{shift}^{PUCCH} - 1\}$ Cell specific cyclic shift offset $n_{OC}$ Orthogonal sequence index for ACK/NACK
$\bar{n}_{OC}$ Orthogonal sequence index for RS
$n_{CS}$ Cyclic shift value of a CAZAC sequence
n' ACK/NACK resource index used for the channelization in a RB

FIG. 18

FIG. 33
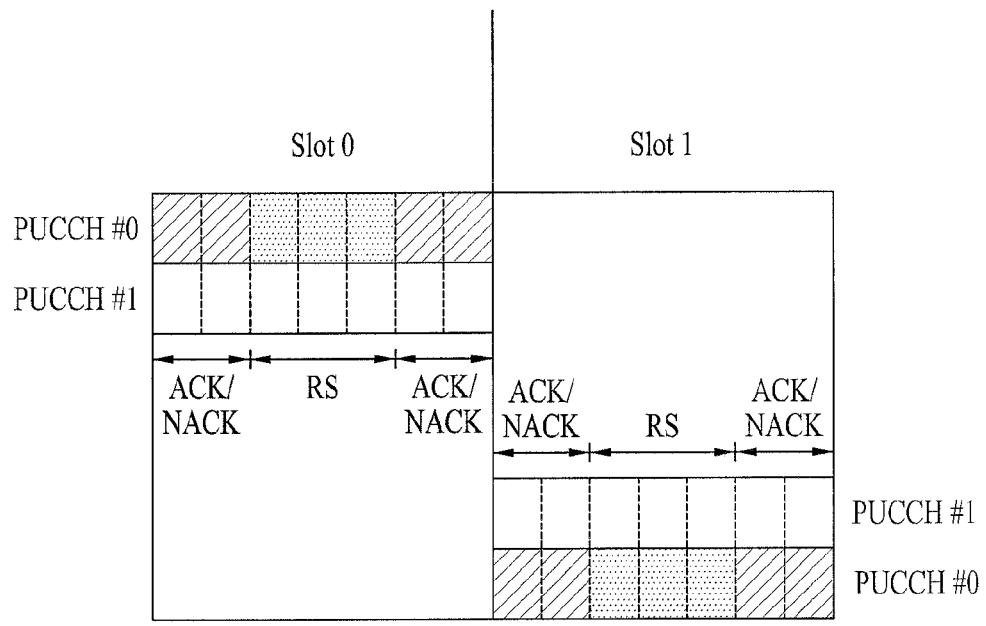
(a)
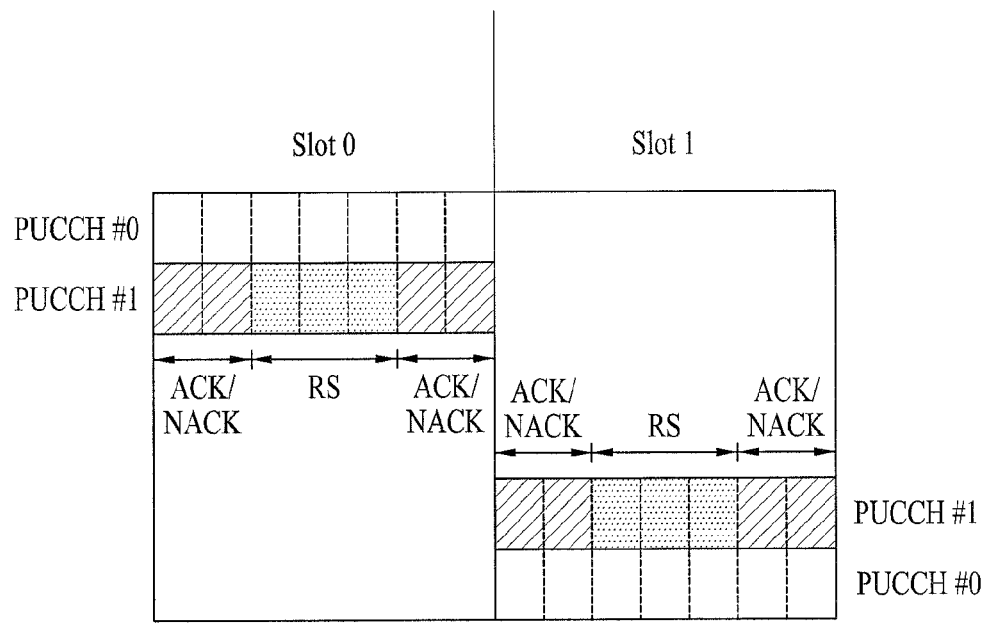
(b)

FIG. 34
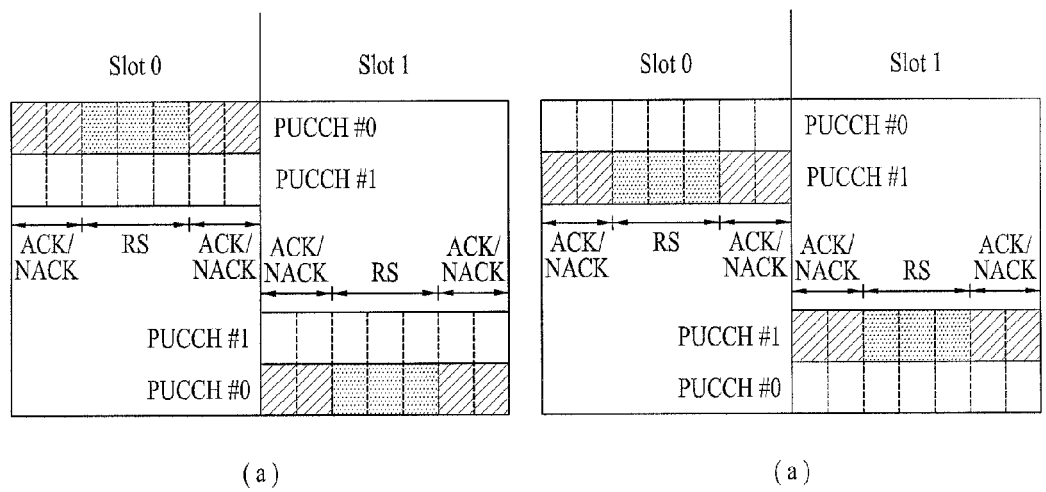
(a)                    (a)
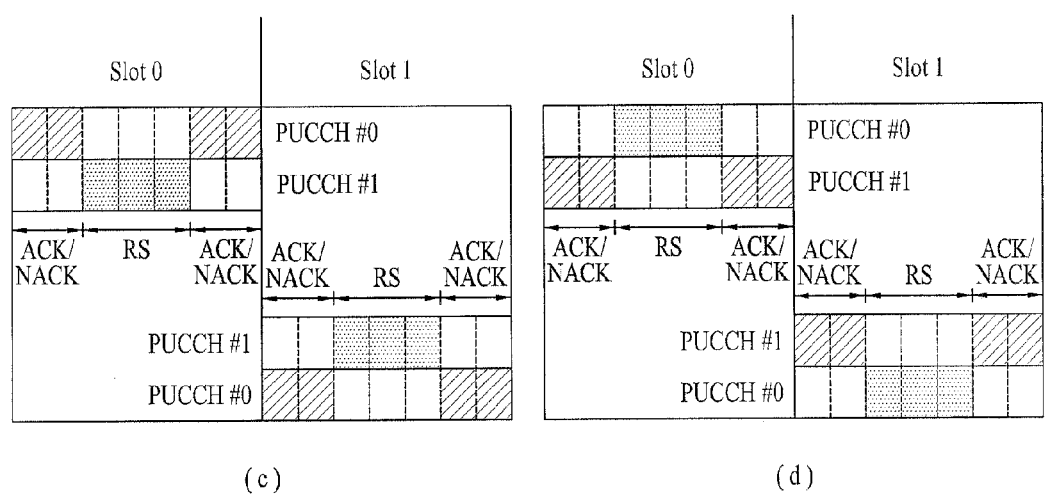
(c)                    (d)

METHOD AND DEVICE FOR TRANSMITTING CONTROL INFORMATION IN A WIRELESS COMMUNICATION SYSTEM

CROSS REFERENCE TO RELATED APPLICATIONS

This non-provisional application is a National Stage entry under U.S.C. §371 of International Application No. PCT/KR2011/006251 filed on Aug. 24, 2011, which claims the benefit of U.S. Provisional Application No. 61/378,952 filed on Sept. 1, 2010. The entire contents of all of the above applications are hereby incorporated by reference.

TECHNICAL FIELD

The present invention relates to a wireless communication system, and more particularly, to a method and apparatus for transmitting control information. The wireless communication system may support Carrier Aggregation (CA).

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DETAILED DESCRIPTION OF THE INVENTION

Technical Problems

It is an object of the present invention to provide a method and apparatus for efficiently transmitting control information in a wireless communication system. It is another object of the present invention to provide a channel format and a signal processing method and apparatus, for efficiently transmitting control information. It is a further object of the present invention to provide a method and apparatus for efficiently allocating resources for transmission of control information.

It will be appreciated by persons skilled in the art that that the technical objects that can be achieved through the present invention are not limited to what has been particularly described hereinabove and other technical objects of the present invention will be more clearly understood from the following detailed description.

Technical Solutions

To achieve these objects and other advantages and in accordance with the purpose of the invention, a method for a User Equipment (UE) to transmit control information in a wireless communication system includes selecting a Physical Uplink Control Channel (PUCCH) resource for the control information from among a plurality of PUCCH resources, and transmitting a modulation value corresponding to the control information through a plurality of antenna ports using the selected PUCCH resource, wherein the plurality of PUCCH resources is divided into a first PUCCH resource group in which PUCCH resources are paired and a second PUCCH resource group in which PUCCH resources are not paired, and the control information is transmitted using a first transmit diversity scheme when the selected PUCCH resource belongs to the first PUCCH resource group, and the control information is transmitted using a second transmit diversity scheme when the selected PUCCH resource belongs to the second PUCCH resource group.

The first transmit diversity scheme may be Space-Code Block Coding (SCBC) and the second transmit diversity scheme may be Spatial Orthogonal Resource Transmit Diversity (SORTD).

The first transmit diversity scheme may be Space-Code Block Coding (SCBC) and the second transmit diversity scheme may be a Single Antenna Port (SAP) mode.

The plurality of PUCCH resources may be odd in number.

In another aspect of the present invention, an apparatus for transmitting control information in a wireless communication system includes a transmitter including a plurality of antennas, and a processor for selecting a Physical Uplink Control Channel (PUCCH) resource for the control information from among a plurality of PUCCH resources, and transmitting a modulation value corresponding to the control information through a plurality of antenna ports using the selected PUCCH resource by controlling the transmitter, wherein the plurality of PUCCH resources is divided into a first PUCCH resource group in which PUCCH resources are paired and a second PUCCH resource group in which PUCCH resources are not paired, and the control information is transmitted using a first transmit diversity scheme when the selected PUCCH resource belongs to the first PUCCH resource group, and the control information is transmitted using a second transmit diversity scheme when the selected PUCCH resource belongs to the second PUCCH resource group.

The first transmit diversity scheme may be Space-Code Block Coding (SCBC) and the second transmit diversity scheme is Spatial Orthogonal Resource Transmit Diversity (SORTD).

The first transmit diversity scheme may be Space-Code Block Coding (SCBC) and the second transmit diversity scheme may be a Single Antenna Port (SAP) mode.

The plurality of PUCCH resources may be odd in number.

In still another aspect of the present invention, a method for a User Equipment (UE) to transmit control information in a wireless communication system includes selecting a Physical Uplink Control Channel (PUCCH) resource for the control information from among a plurality of PUCCH resources, and transmitting a modulation value corresponding to the control information through a plurality of antenna ports using the selected PUCCH resource, wherein the plurality of PUCCH resources is divided into a first PUCCH resource group in which PUCCH resources are paired and a second PUCCH resource group in which PUCCH resources are not paired, and the control information is transmitted using a first transmit diversity scheme when the selected PUCCH resource belongs to the first PUCCH resource group, and the control information is transmitted using a second transmit diversity scheme when the selected PUCCH resource belongs to the second PUCCH resource group.

The transmit diversity scheme may be Space-Code Block Coding (SCBC).

The plurality of PUCCH resources may be odd in number.

In a further aspect of the present invention, an apparatus for transmitting control information in a wireless communication system includes a transmitter including a plurality of antennas, and a processor for selecting a Physical Uplink Control Channel (PUCCH) resource for the control information from among a plurality of PUCCH resources, and transmitting a modulation value corresponding to the control information through a plurality of antenna ports using the selected PUCCH resource by controlling the transmitter, wherein the plurality of PUCCH resources is divided into a first PUCCH resource group in which PUCCH resources are paired and a second PUCCH resource group in which PUCCH resources are not paired, and the control information is transmitted using a first transmit diversity scheme when the selected PUCCH resource belongs to the first PUCCH resource group, and the control information is transmitted using a second transmit diversity scheme when the selected PUCCH resource belongs to the second PUCCH resource group.

The transmit diversity scheme may be Space-Code Block Coding (SCBC).

The plurality of PUCCH resources may be odd in number.

Advantageous Effects

According to the present invention, control information can be efficiently transmitted in a wireless communication system. Further, a channel format and a signal processing method for efficiently transmitting resources can be provided. Moreover, resources for transmission of control information can be efficiently allocated.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included as a part of the detailed description to provide a further understanding of the invention, provide embodiments of the invention and together with the description serve to explain the principle of the invention. In the drawings.

FIG. 5 illustrates examples of mapping input symbols to subcarriers in the frequency domain while satisfying a single carrier property;

FIG. 17 illustrates ACK/NACK channelization for PUCCH Formats 1a and 1b;

FIG. 18 illustrates channelization for a hybrid structure of PUCCH Format 1/1a/1b and PUCCH Format 2/2a/2b in the same PRB;

FIG. 33 illustrates the transmission structure of ACK/NACK information using channel selection, to which the present invention is applied;

FIG. 34 illustrates the transmission structure of ACK/NACK information using enhanced channel selection, to which the present invention is applied.

BEST MODE FOR CARRYING OUT THE INVENTION

Figure 1:
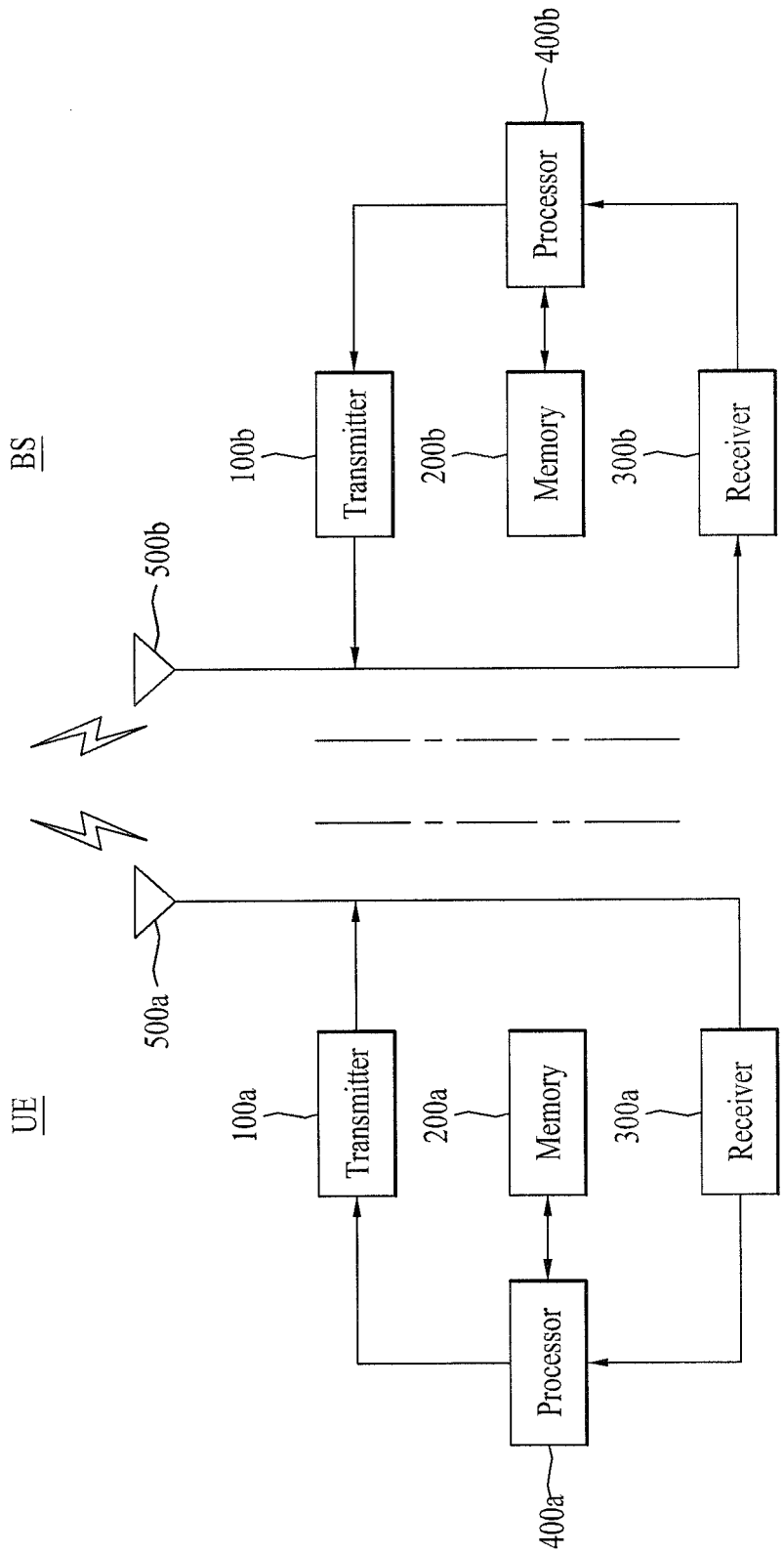
FIG. 1 illustrates the configuration of a UE and a BS, to which the present invention is applied.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Techniques, devices, and systems described herein may be used in various wireless multiple access systems. The wireless access system includes, for example, Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), and Multi-Carrier Frequency Division Multiple Access (MC-FDMA) systems. CDMA may be implemented as a radio technology such as Universal Terrestrial Radio Access (UTRA) or CDMA2000. TDMA may be implemented as a radio technology such as Global System for Mobile communication (GSM), General Packet Radio Service (GPRS), and Enhanced Data Rates for GSM Evolution (EDGE). OFDMA may be implemented as a radio technology such as Institute of Electrical and Electronics Engineers (IEEE) 802.11 (Wi-Fi), IEEE 802.16 (WiMAX), IEEE 802.20, and Evolved-UTRA (E-UTRA). UTRAN is a part of Universal Mobile Telecommunication System (UMTS) and 3rd Generation Partnership Project (3GPP) Long Term Evolution (LTE) is a part of Evolved UMTS (E-UMTS) using E-UTRAN. 3GPP LTE employs OFDMA on downlink and SC-FDMA on uplink. LTE-A is an evolved version of 3GPP LTE. For convenience of description, it is assumed that the present invention is applied to 3GPP LTE/LTE-A. However, the technical features of the present invention are not limited thereto. For example, while the following detailed description is given focusing upon a 3GPP LTE/LTE-A wireless communication system as a wireless communication system, the description is applicable to any other wireless communication systems except for matters specific to the 3GPP LTE/LTE-A system.

In some instances, known structures and devices may be omitted or may be shown in block diagram form, focusing on important features of the structures and devices, so as not to obscure the concept of the invention. The same reference numbers will be used throughout this specification to refer to the same parts.

In the present invention, a terminal may be fixed or mobile and generically refers to a device for transmitting and receiving data and control information by communicating with a Base Station (BS). The term terminal may be referred to as User Equipment (UE), Mobile Station (MS), Mobile Terminal (MT), User Terminal (UT), Subscriber Station (SS), wireless device, Personal Digital Assistant (PDA), wireless modem, handheld device, etc.

In addition, a BS generically refers to a fixed station which communicates with a terminal or another BS to exchange data and control information with the terminal or another BS. The term BS may be referred to as evolved Node B (eNB), Base Transceiver System (BTS), Access Point (AP), etc.

In the present invention, allocation of a specific signal to a frame/subframe/slot/carrier/subcarrier means transmitting the specific signal on a corresponding carrier/subcarrier during the duration of a corresponding frame/subframe/slot or at the timing of the corresponding frame/subframe/slot.

In the present invention, a rank or a transmission rank refers to the number of layers that are multiplexed or allocated to one Orthogonal Frequency Division Multiplexing (OFDM) symbol or one Resource Element (RE).

In the present invention, a Physical Downlink Control Channel (PDCCH), Physical Control Format Indicator Channel (PCFICH), Physical Hybrid automatic retransmit request Indicator Channel (PHICH), and Physical Downlink Shared Channel (PDSCH) are sets of REs that carry Downlink Control Information (DCI), a Control Format Indicator (CFI), a downlink Acknowledgment/Negative Acknowledgment (ACK/NACK), and downlink data, respectively.

Physical Uplink Control Channel (PUCCH), Physical Uplink Shared Channel (PUSCH), and Physical Random Access Channel (PRACH) are sets of REs that carry Uplink Control Information (UCI), uplink data, and a random access signal, respectively.

Especially, REs allocated to or belonging to the PDCCH, PCFICH, PHICH, PDSCH, PUCCH, PUSCH, and PRACH are referred to as PDCCH, PCFICH, PHICH, PDSCH, PUCCH, PUSCH, and PRACH REs or as PDCCH, PCFICH, PHICH, PDSCH, PUCCH, PUSCH, and PRACH resources.

Accordingly, if it is said that a UE transmits a PUCCH, PUSCH, or PRACH, this may mean that the UE transmits UCI, uplink data, or a random access signal on the PUCCH, PUSCH, or PRACH. In addition, if it is said that a BS transmits a PDCCH, PCFICH, PHICH, or PDSCH, this may mean that the BS transmits DCI or downlink data on the PDCCH, PCFICH, PHICH, or PDSCH.

Meanwhile, mapping ACK/NACK information to a specific constellation point may have the same meaning as mapping ACK/NACK information to a specific complex modulation symbol. Mapping ACK/NACK information to a specific complex modulation symbol may also be used as the same meaning as modulating ACK/NACK information to a specific complex modulation symbol.

FIG. 1 illustrates the configuration of a UE and a BS, to which the present invention is applied. The UE operates as a transmitting device on uplink and as a receiving device on downlink. On the contrary, the BS operates as a receiving device on uplink and as a transmitting device on downlink.

Referring to FIG. 1, the UE and the BS include antennas 500a and 500b for receiving information, data, signals, or messages, transmitters 100a and 100b for transmitting information, data, signals, or messages by controlling the antennas 500a and 500b, receivers 300a and 300b for receiving information, data, signals, or messages by controlling the antennas 500a and 500b, and memories 200a and 200b for temporarily or permanently storing various types of information in a wireless communication system. The UE and the BS further include processors 400a and 400b connected operationally to the transmitters, 100a and 100b, the receivers 300a and 300b, and the memories 200a and 200b, for controlling each component.

The transmitter 100a, the receiver 300a, the memory 200a, and the processor 400a of the UE may be configured as independent components by separate chips or two or more thereof may be integrated into one chip. The transmitter 100b, the receiver 300b, the memory 200b, and the processor 400b of the BS may be configured as independent components by separate chips or two or more thereof may be integrated into one chip. The transmitter and the receiver may be integrated into a single transceiver in the UE or the BS.

The antennas 500a and 500b transmit signals generated from the transmitters 100a and 100b to the outside or receive signals from the outside and provide the received signals to the receivers 300a and 300b. The antennas 500a and 500b are also referred to as antenna ports. An antenna port may correspond to one physical or logical antenna or a combination of a plurality of physical or logical antennas. If a transmitter and a receiver support Multiple Input Multiple Output (MIMO) in which data is transmitted and received through a plurality of antennas, each of the transmitter and the receiver may be connected to two or more antennas.

The processor 400a or 400b generally controls overall operation of the components or modules of the UE or the BS. Especially, the processors 400a and 400b may perform various control functions for implementing the present invention, a Medium Access Control (MAC) frame conversion control function based on service characteristics and a propagation environment, a power saving mode function for controlling an idle-mode operation, a handover function, an authentication and encryption function, etc. The processors 400a and 400b may be called controllers, microcontrollers, microprocessors, or microcomputers. Meanwhile, the processors 400a and 400b may be configured in hardware, firmware, software, or a combination of hardware, firmware, and software.

In a hardware configuration, the processors 400a and 400b may include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. which are configured to implement the present invention.

In a firmware or software configuration, firmware or software may be configured so as to include a module, a procedure, a function, etc. that perform the functions or operations of the present invention. The firmware or software configured to implement the present invention may be included in the processors 400a and 400b, or may be stored in the memories 200a and 200b and executed by the processors 400a and 400b.

The transmitters 100a and 100b encode and modulate signals or data which are scheduled by the processors 400a and 400b or schedulers connected to the processors 400a and 400b and to be transmitted to the outside and transmit the modulated signals or data to the antennas 500a and 500b. The transmitters 100a and 100b and the receivers 300a and 300b of the UE and the BS may be configured differently according to operations of processing a transmission signal and a received signal.

The memories 200a and 200b may store programs for processing and controlling in the processors 400a and 400b and may temporarily store input and output information. The memories 200a and 200b may be used as buffers. The memories 200a and 200b may be configured using a flash memory type, a hard disk type, a multimedia card micro type, a card type memory (e.g. a Secure Digital (SD) or extreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disc, etc.

Figure 2:
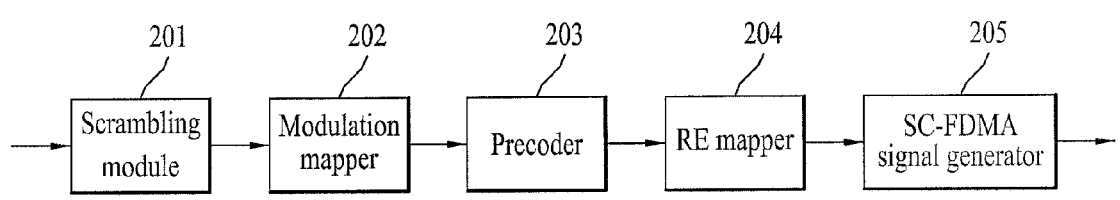
FIG. 2 illustrates a signal processing operation for transmitting an uplink signal in a UE.

FIG. 2 illustrates a signal processing operation for transmitting an uplink signal in a UE. Referring to FIG. 2, the transmitter 100a of the UE may include a scrambling module 201, a modulation mapper 202, a precoder 203, an RE mapper 204, and an SC-FDMA signal generator 205.

The scrambling module 201 may scramble a transmission signal using a scrambling signal in order to transmit an uplink signal. The modulation mapper 202 modulates the scrambled signal received from the scrambling module 201 to complex modulation symbols using Binary Phase Shift Keying (BPSK), Quadrature Phase Shift Keying (QPSK), or 16 Quadrature Amplitude Modulation (QAM)/64 QAM according to the type of the transmission signal or a channel state. The precoder 203 processes the complex modulation symbols received from the modulation mapper 202. The RE mapper 204 may map the complex modulation symbols received from the precoder 203 to time-frequency REs. After being processed in the SC-FDMA signal generator 205, the mapped signal may be transmitted to a BS through an antenna port.

Figure 3:
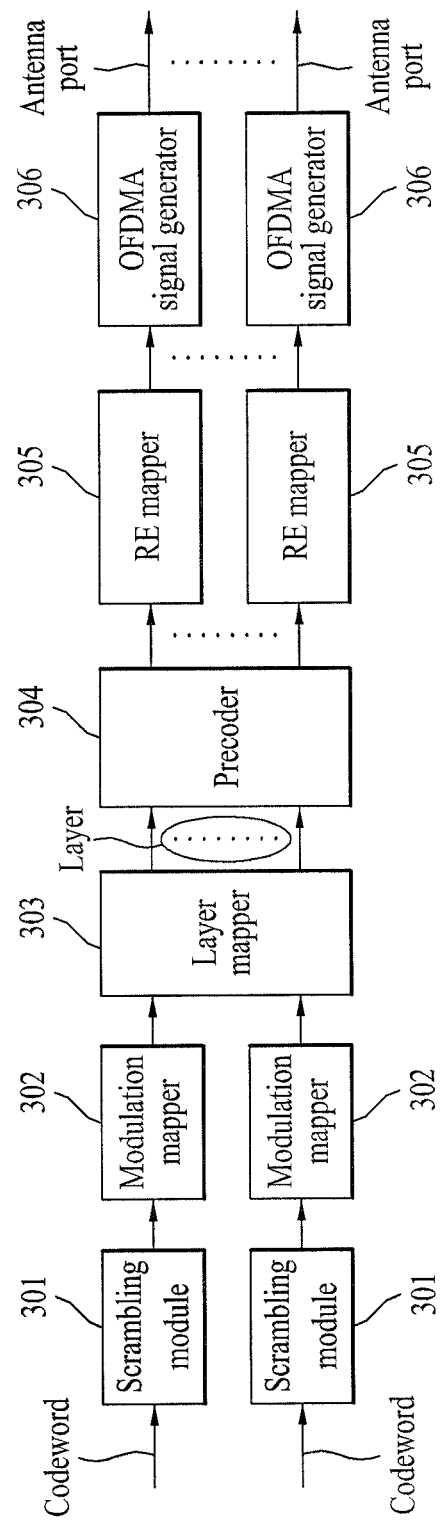
FIG. 3 illustrates a signal processing operation for transmitting a downlink signal in a BS.

FIG. 3 illustrates a signal processing operation for transmitting a downlink signal in a BS. Referring to FIG. 3, the transmitter 100b of the BS may include scrambling modules 301, modulation mappers 302, a layer mapper 303, a precoder 304, RE mappers 305, and OFDMA signal generators 306.

To transmit a signal or one or more codewords on downlink, the scrambling modules 301 and the modulation mappers 302 may modulate the signal or the one or more codewords to complex modulation symbols, as in FIG. 2. The layer mapper 303 maps the complex modulation symbols to a plurality of layers. The precoder 304 may multiply the layers by a precoding matrix and may allocate the multiplied signals to respective transmission antennas. The RE mappers 305 map the antenna-specific signals received from the precoder 304 to time-frequency REs. After being processed in the OFDMA signal generators 306, the mapped signals may be transmitted through respective antenna ports.

In the wireless communication system, uplink signal transmission from a UE is more problematic than downlink signal transmission from a BS in Peak-to-Average Power Ratio (PAPR). Accordingly, SC-FDMA is adopted for uplink signal transmission, unlike OFDMA used for downlink signal transmission as described above with reference to FIGS. 2 and 3.

Figure 4:
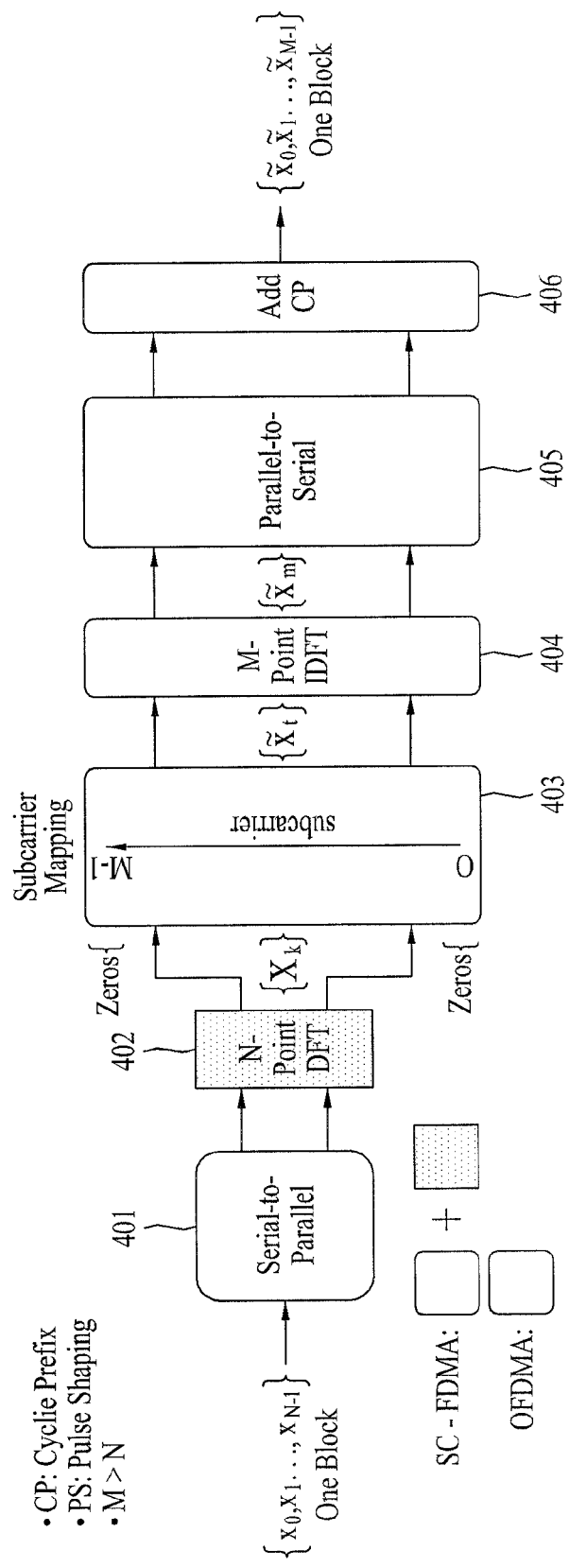
FIG. 4 illustrates SC-FDMA and OFDMA, to which the present invention is applied.

FIG. 4 illustrates SC-FDMA and OFDMA, to which the present invention is applied. The 3GPP system uses OFDMA on downlink and SC-FDMA on uplink.

Referring to FIG. 4, a UE for uplink signal transmission and a BS for downlink signal transmission commonly have a serial-to-parallel converter 401, a subcarrier mapper 403, an M-point Inverse Discrete Fourier Transform (IDFT) module 404, and a Cyclic Prefix (CP) addition module 406. Nonetheless, the UE further includes an N-point Discrete Fourier Transform (DFT) module 402 to transmit an uplink signal in SC-FDMA. The N-point DFT module 402 partially offsets the effects of IDFT performed by the M-point IDFT module 404 so that a transmission uplink signal may have a single carrier property.

SC-FDMA should satisfy the single carrier property. FIG. 5 illustrates examples of mapping input symbols to subcarriers in the frequency domain while satisfying the single carrier property. If DFT symbols are allocated to subcarriers according to one of the schemes illustrated in FIGS. 5($a$) and 5($b$), a transmission signal satisfying the single carrier property may be obtained. FIG. 5($a$) illustrates localized mapping and FIG. 5($b$) illustrates distributed mapping.

Figure 6:
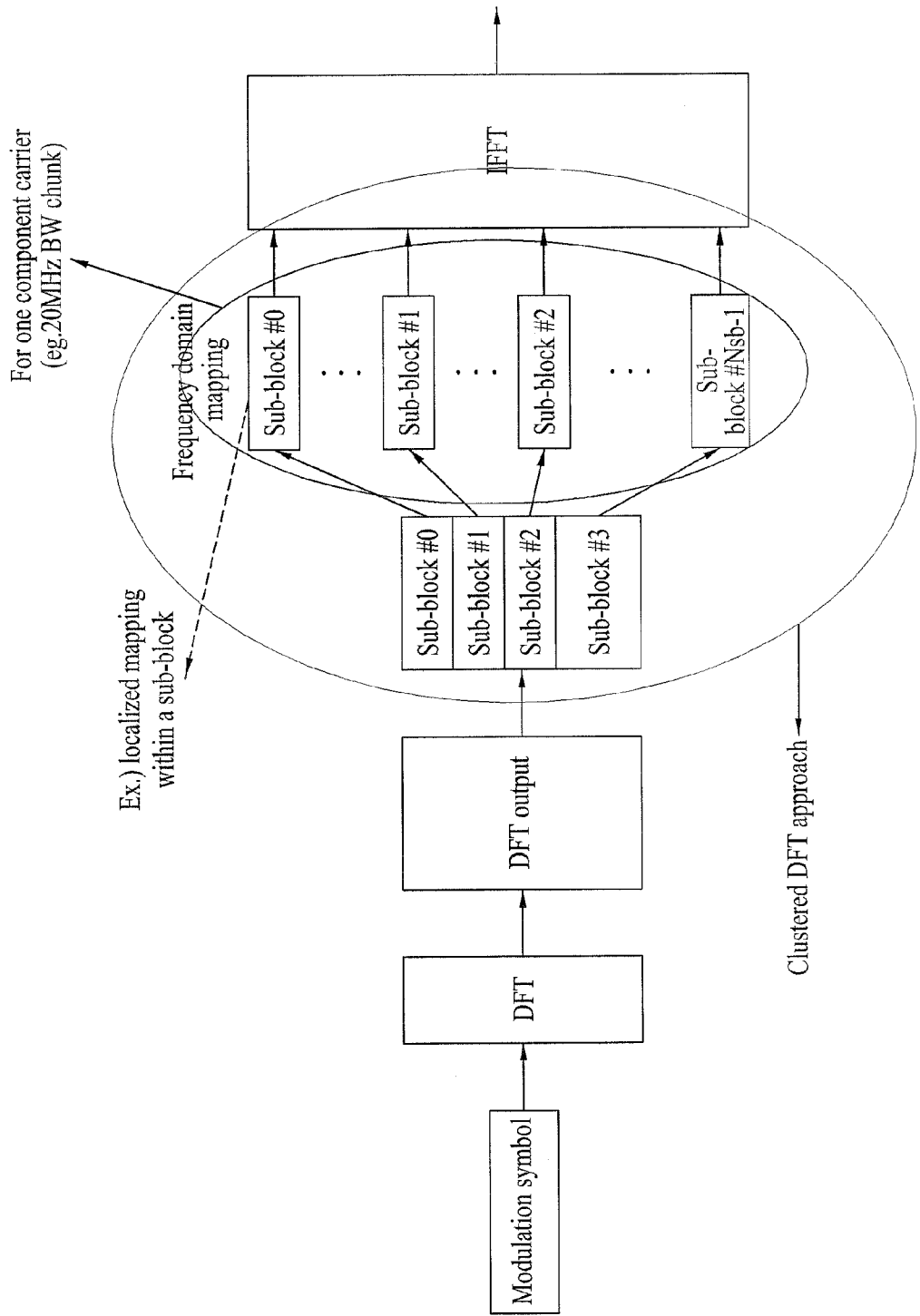
FIG. 6 illustrates a signal processing operation for mapping DFT output samples to a single carrier in clustered SC-FDMA.
Figure 7:
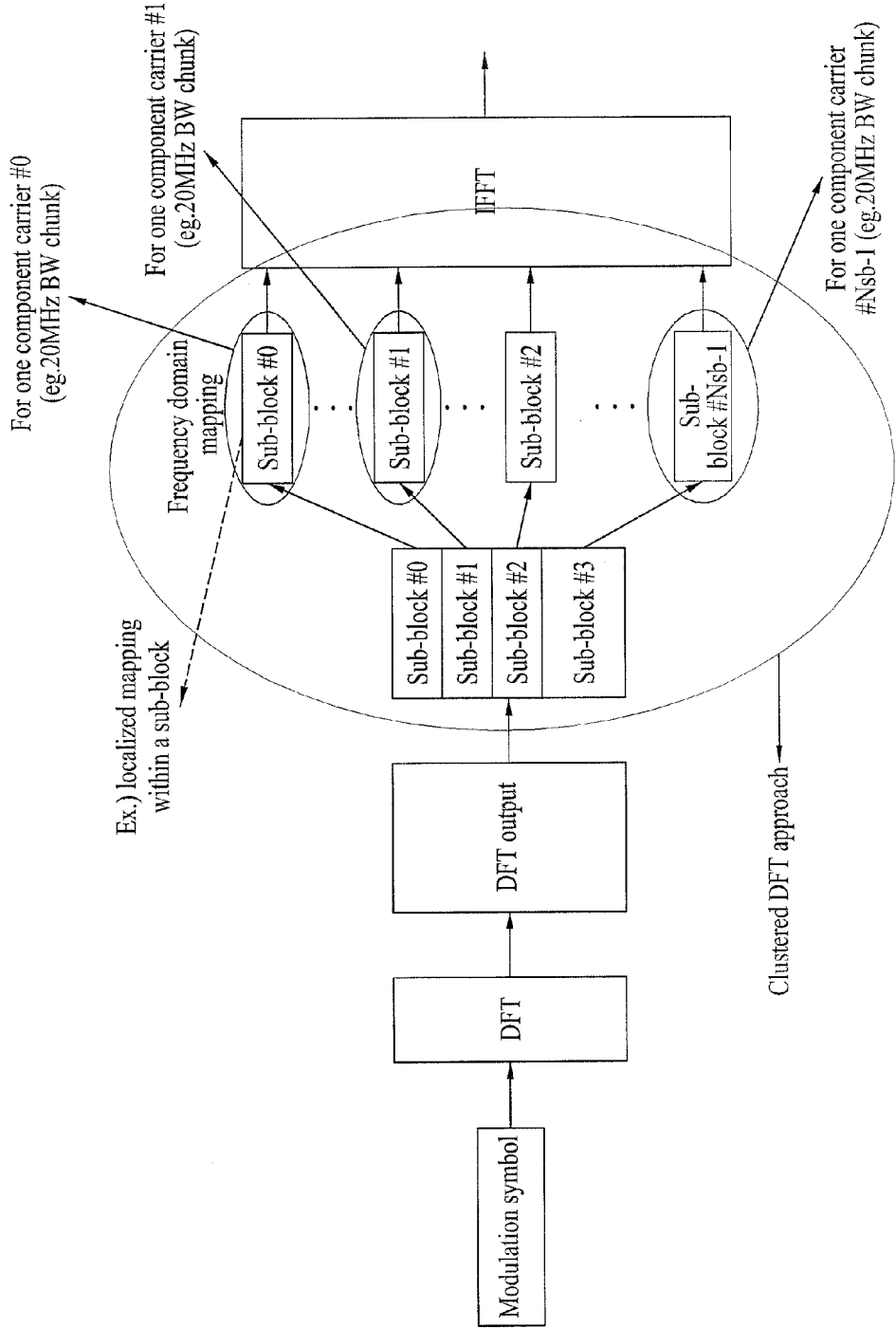
FIGS. 7 and 8 illustrate signal processing operations for mapping DFT output samples to multiple carriers in clustered SC-FDMA.
Figure 8:
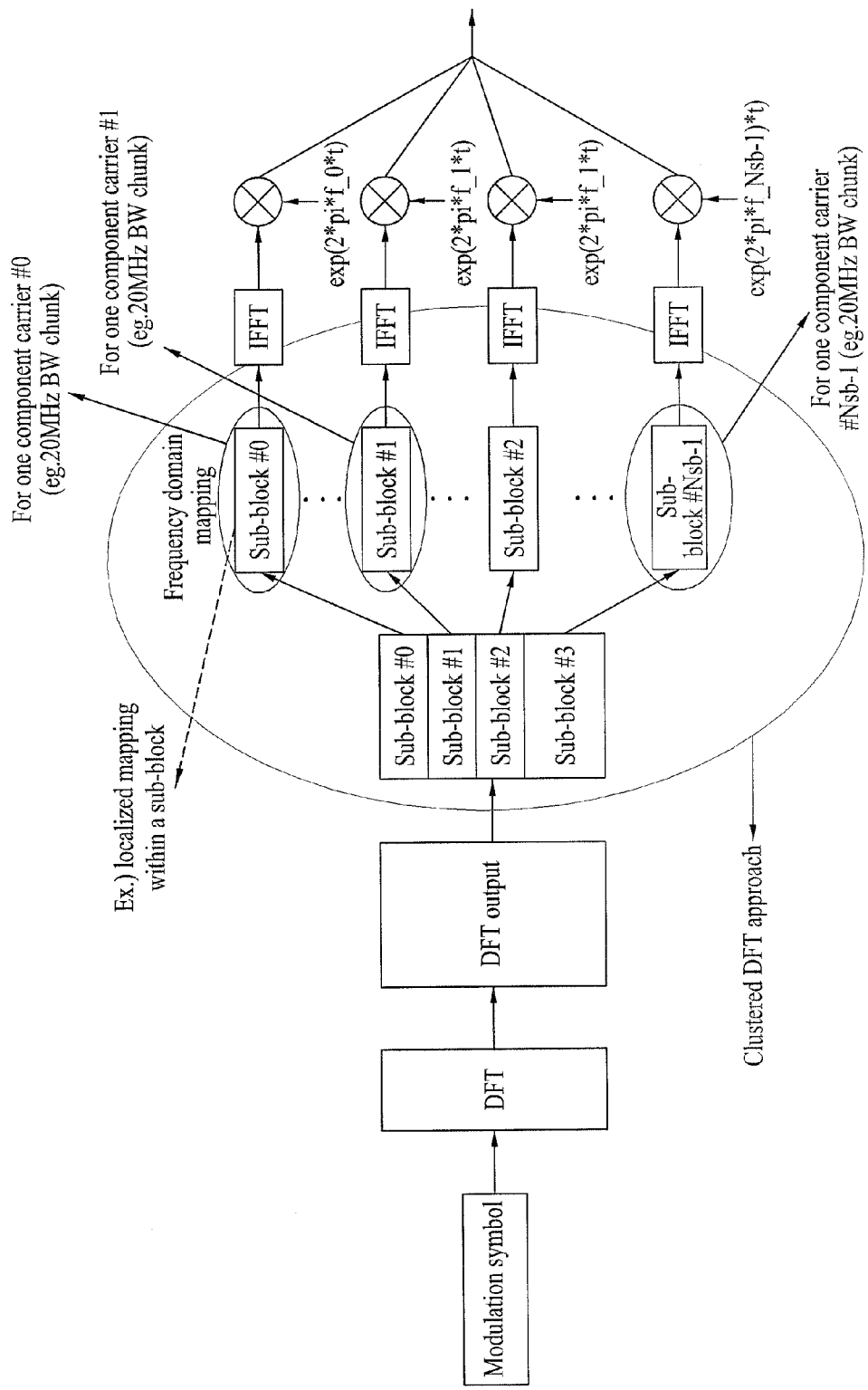

Meanwhile, the transmitters 100a and 100b may adopt clustered DFT spread OFDM (DFT-s-OFDM). Clustered DFT-s-OFDM is a modified version of conventional SC-FDMA. In clustered DFT-s-OFDM, a precoded signal is divided into a predetermined number of sub-blocks and mapped to subcarriers in a non-contiguous manner. FIGS. 6 to 8 illustrate examples of mapping an input symbol to a single carrier by clustered DFT-s-OFDM.

FIG. 6 illustrates an operation for mapping DFT processed samples to a single carrier in clustered SC-FDMA. FIGS. 7 and 8 illustrate operations for mapping DFT processed samples to multiple carriers in clustered SC-FDMA. FIG. 6 illustrates the application of intra-carrier clustered SC-FDMA, whereas FIGS. 7 and 8 illustrate the application of inter-carrier clustered SC-FDMA. FIG. 7 illustrates signal generation through a single IFFT block in the case of alignment of a subcarrier spacing between contiguous subcarriers in a situation in which Component Carriers (CCs) are contiguously allocated in the frequency domain. FIG. 8 illustrates signal generation through a plurality of IFFT blocks in a situation in which CCs are non-contiguously allocated in the frequency domain.

Figure 9:
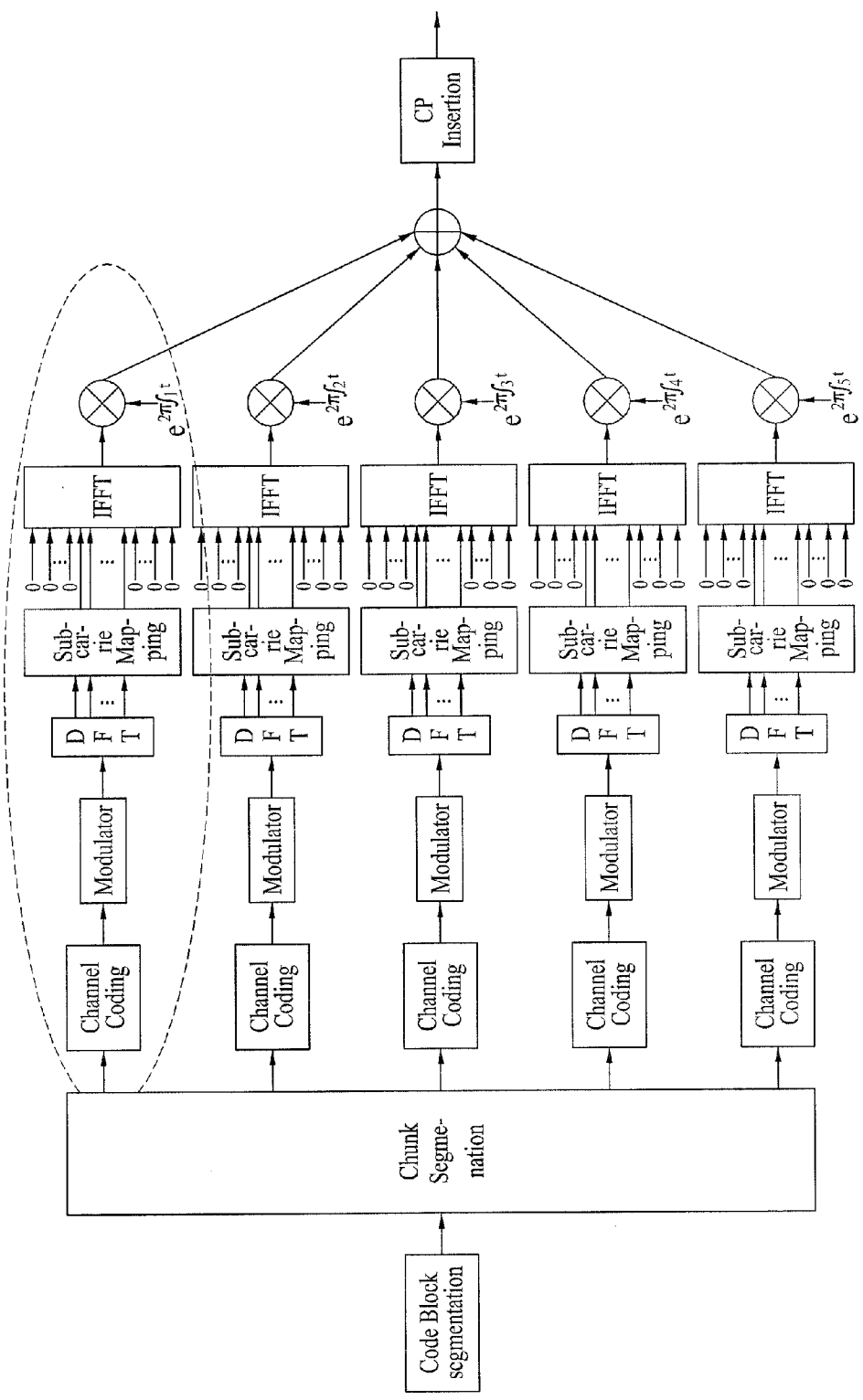
FIG. 9 illustrates a signal processing operation in segmented SC-FDMA.

FIG. 9 illustrates a signal processing operation in segmented SC-FDMA.

As the number of DFT blocks is equal to the number of IFFT blocks and thus the DFT blocks and the IFFT blocks are in a one-to-one correspondence, segmented SC-FDMA is a simple extension of the DFT spreading and IFFT subcarrier mapping structure of conventional SC-FDMA and may be expressed as NxSC-FDMA or NxDFT-s-OFDMA. In this disclosure, segmented SC-FDMA includes all these terms. Referring to FIG. 9, in segmented SC-FDMA, all modulation symbols in the time domain are divided into N groups (where N is an integer greater than 1) and subjected to a DFT process in units of a group in order to relieve single carrier property constraints.

Figure 10:
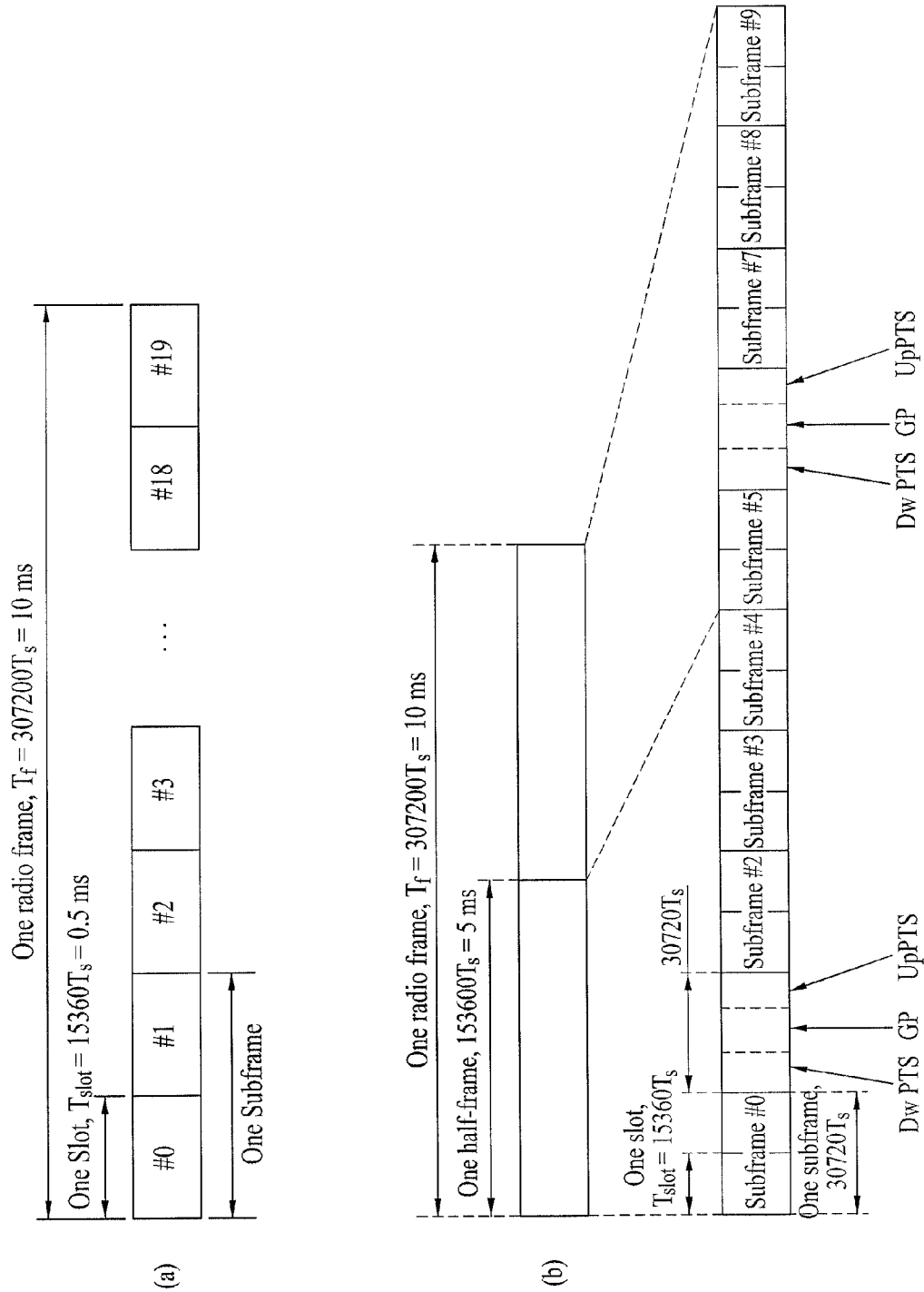
FIG. 10 illustrates exemplary radio frame structures in a wireless communication system.

FIG. 10 illustrates exemplary radio frame structures used in a wireless communication system. Specifically, FIG. 10(a) illustrates a radio frame of Frame Structure type 1 (FS-1) in the 3GPP LTE/LTE-A system and FIG. 10(b) illustrates a radio frame of Frame Structure type 2 (FS-2) in the 3GPP LTE/LTE-A system. The frame structure of FIG. 10(a) may be applied to Frequency Division Duplex (FDD) mode and half-FDD (H-FDD) mode, while the frame structure of FIG. 10(b) may be applied to Time Division Duplex (TDD) mode.

Referring to FIG. 10, a radio frame has a length of 10 ms (307200 Ts) in 3GPP LTE/LTE-A, including 10 equally sized subframes. The 10 subframes of the radio frame may be numbered. Herein, $T_s$ is a sampling time, expressed as $T_s=1/(2048\times15\text{ kHz})$. Each subframe is 1 ms long, including two slots. The 20 slots of the radio frame may be sequentially numbered from 0 to 19. Each slot has a length of 0.5 ms. A time required to transmit one subframe is defined as a Transmission Time Interval (TTI). Time resources may be identified by a radio frame number (or a radio frame index), a subframe number (or a subframe index), and a slot number (or a slot index).

Different radio frames may be configured according to duplex mode. For example, in FDD mode, since downlink transmission and uplink transmission are distinguished by frequency, the radio frame includes either downlink subframes or uplink subframes.

On the other hand, in TDD mode, since downlink transmission and uplink transmission are distinguished by time, the subframes in the frame are divided into downlink subframes and uplink subframes.

Figure 11:
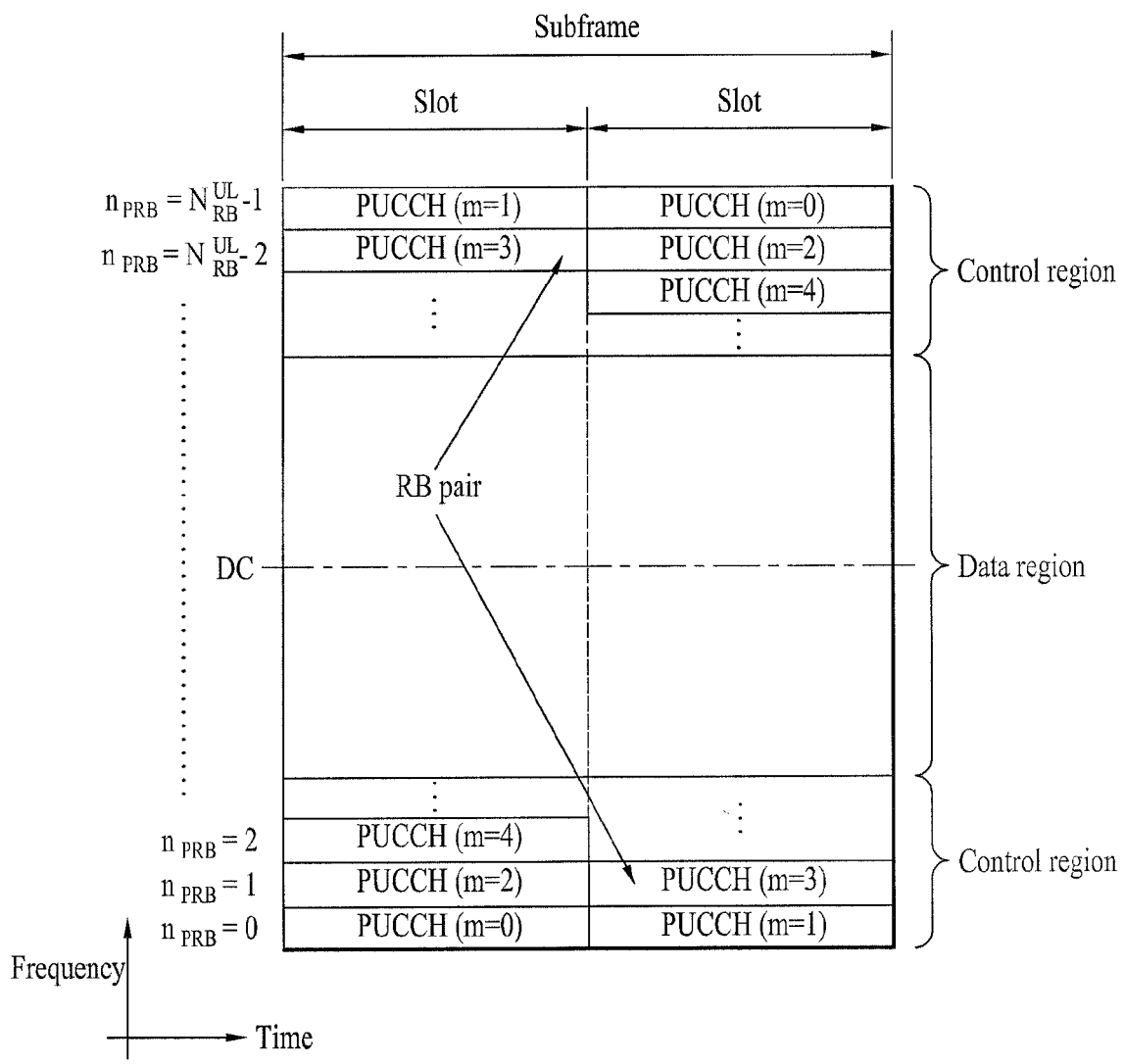
FIG. 11 illustrates an uplink subframe structure.

FIG. 11 illustrates an uplink subframe structure to which the present invention is applied. Referring to FIG. 11, an uplink subframe may be divided into a control region and a data region in the frequency domain. At least one PUCCH may be allocated to the control region to transmit UCI. In addition, at least one PUSCH may be allocated to the data region to transmit user data. If a UE adopts SC-FDMA, the PUCCH and the PUSCH cannot be transmitted simultaneously in order to maintain single carrier property.

UCI transmitted on a PUCCH differs in size and usage depending on PUCCH format. The size of UCI may also vary according to coding rate. For example, the following PUCCH formats may be defined.

(1) PUCCH Format 1: used for On-Off Keying (OOK) modulation and a Scheduling Request (SR).

(2) PUCCH Formats 1a and 1b: used for transmitting ACK/NACK information.

1) PUCCH Format 1a: ACK/NACK information modulated by BPSK for one codeword.

2) PUCCH Format 1b: ACK/NACK information modulated by QPSK for two codewords.

(3) PUCCH Format 2: modulated by QPSK and used for Channel Quality Indicator (CQI) transmission.

(4) PUCCH Formats 2a and 2b: used for simultaneous transmission of a CQI and ACK/NACK information.

Table 1 lists modulation schemes and numbers of bits per subframe for PUCCH formats and Table 2 lists numbers of Reference Signals (RSs) per slot for PUCCH formats. Table 3 lists SC-FDMA symbol positions of RSs for PUCCH formats. In Table 1, PUCCH Formats 2a and 2b correspond to the case of a normal CP.

TABLE 1

| PUCCH Format | Modulation | Number of Bits per Subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 2

| PUCCH Format | Normal CP | Extended CP |
|---|---|---|
| 1, 1a, 1b | 3 | 2 |
| 2 | 2 | 1 |
| 2a, 2b | 2 | N/A |

TABLE 3

| | SC-FDMA Symbol Position of RS | |
|---|---|---|
| PUCCH Format | Normal CP | Extended CP |
| 1, 1a, 1b | 2, 3, 4 | 2, 3 |
| 2, 2a, 2b | 1, 5 | 3 |

Subcarriers far from a Direct Current (DC) subcarrier are used for the control region in the uplink subframe. In other words, subcarriers at both ends of an uplink transmission bandwidth are allocated for transmission of UCI. The DC subcarrier is a remaining component not used for signal transmission and mapped to carrier frequency $f_0$ during frequency up-conversion in an OFDMA/SC-FDMA signal generator.

A PUCCH for one UE is allocated to an Resource block (RB) pair in a subframe and the RBs belonging to the RB pair occupy different subcarriers in two slots. This PUCCH allocation is called frequency hopping of an RB pair allocated to a PUCCH across a slot boundary. However, if frequency hopping is not applied, the RB pair occupies the same subcarriers in two slots. Since a PUCCH for a UE is allocated to an RB pair in a subframe irrespective of frequency hopping, the same PUCCH is transmitted twice, each time in one RB of each slot in the subframe.

Hereinafter, an RB pair used for transmission of a PUCCH in a subframe is referred to as a PUCCH region or a PUCCH resource. For convenience of description, a PUCCH transmitting ACK/NACK information is referred to as an ACK/NACK PUCCH, a PUCCH transmitting Channel Quality Indicator/Precoding Matrix Index/Rank Indicator (CQI/PMI/RI) information is referred to as a Channel State Information (CSI) PUCCH, and a PUCCH transmitting SR information is referred to as an SR PUCCH.

A UE receives PUCCH resources for transmission of UCI, allocated explicitly or implicitly by a BS.

UCI such as ACK/NACK information, CQI information, PMI information, RI information, and SR information may be transmitted in the control region of an uplink subframe.

The UE and the BS transmit and receive signals or data from or to each other in the wireless communication system. When the BS transmits data to the UE, the UE decodes the received data. If data decoding is successful, the UE transmits ACK to the BS. On the contrary, if the UE fails to decode data, the UE transmits NACK to the BS. The same principle is applied to the opposite case, i.e., the case in which the UE transmits data to the BS. In the 3GPP LTE system, the UE receives a PDSCH from the BS and transmits ACK/NACK for the received PDSCH on a PUCCH that is implicitly determined by a PDCCH carrying scheduling information for the PDSCH.

Figure 12:
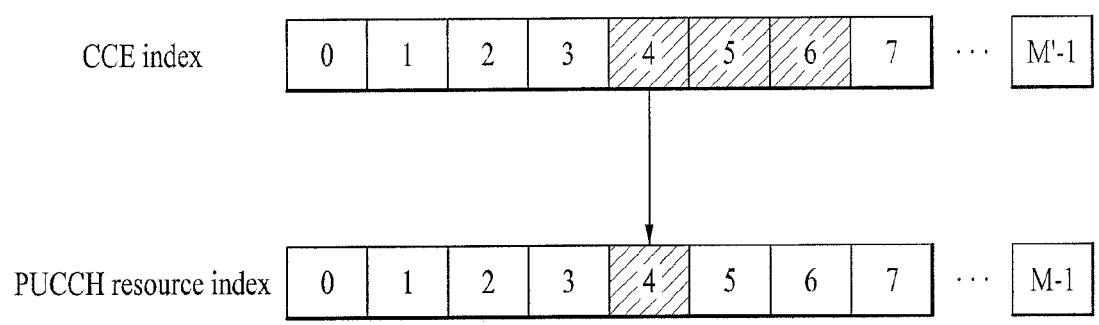
FIG. 12 illustrates a structure for determining a PUCCH resource for ACK/NACK transmission.

FIG. 12 illustrates a structure for determining a PUCCH resource for ACK/NACK transmission, to which the present invention is applied.

A PUCCH resource for transmission of ACK/NACK information is not allocated in advance to a UE and a plurality of UEs within a cell separately uses a plurality of PUCCH resources at each use time. Specifically, a PUCCH resource used by a UE for transmission of ACK/NACK information is implicitly determined by a PDCCH carrying scheduling information for a PDSCH that delivers downlink data. An entire area carrying PDCCHs in a downlink subframe includes a plurality of Control Channel Elements (CCEs) and a PDCCH transmitted to a UE includes one or more CCEs. A CCE includes a plurality of (e.g. 9) Resource Element Groups (REGs). One REG includes four contiguous REs except for an RS. The UE transmits ACK/NACK information on an implicit PUCCH that is derived or calculated by a function of a specific CCE index (e.g. the first or lowest CCE index) from among the indexes of CCEs included in a received PDCCH.

Referring to FIG. 12, PUCCH resource indexes correspond to PUCCH resources for transmitting an ACK/NACK. As illustrated in FIG. 12, on the assumption that a PDCCH including CCE numbers 4, 5 and 6 delivers scheduling information for a PDSCH to a UE, the UE transmits ACK/NACK information to a BS on a PUCCH resource, for example, PUCCH number derived or calculated from the lowest CCE index of the PDCCH, CCE index 4.

In FIG. 12, a maximum of M' CCEs is present in a downlink subframe and a maximum of M PUCCH resources is present in an uplink subframe. Although M may be equal to M', M may be different from M' and CCEs may be mapped to PUCCHs in an overlapping manner. For instance, a PUCCH resource index may be calculated as follows.

$$n_{PUCCH}^{(1)} = n_{CCE} + N_{PUCCH}^{(1)}$$ Equation 1

$n_{PUCCH}^{(1)}$ denotes a PUCCH resource index for transmission of ACK/NACK information, $N_{PUCCH}^{(1)}$ denotes a signal value received from a higher layer, and $n_{CCE}$ denotes the lowest of CCE indexes used for transmission of a PDCCH.

Figure 13:
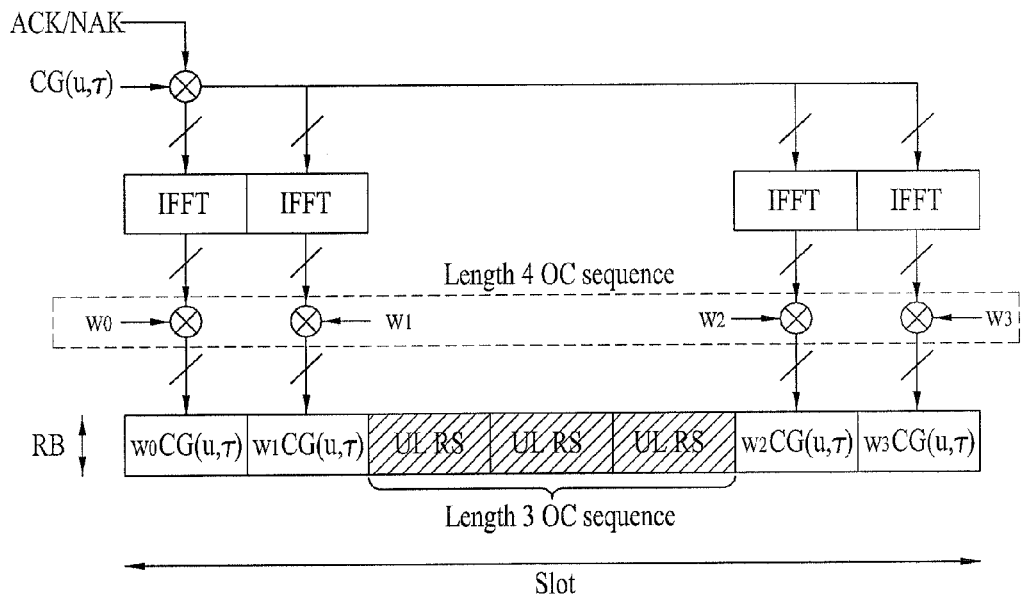
FIGS. 13 and 14 illustrate slot-level structures of PUCCH Formats 1a and 1b for ACK/NACK transmission.
Figure 14:
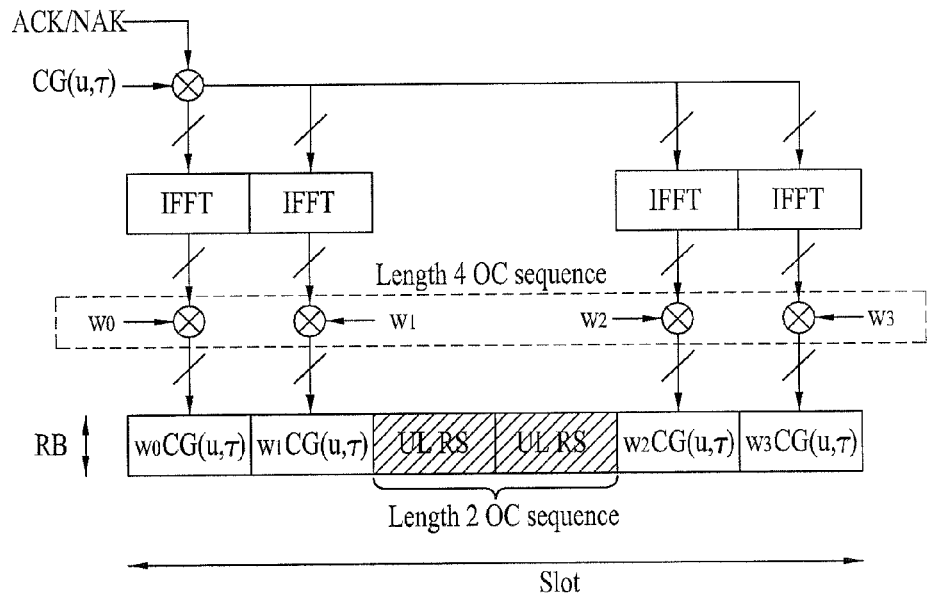

FIGS. 13 and 14 illustrate slot-level structures of PUCCH Formats 1a and 1b for ACK/NACK transmission.

FIG. 13 illustrates PUCCH Formats 1a and 1b in case of a normal CP and FIG. 14 illustrates PUCCH Formats 1a and 1b in case of an extended CP. The same UCI is repeated on a slot basis in a subframe in PUCCH Format 1a and 1b. A UE transmits ACK/NACK signals through different resources of different Cyclic Shifts (CSs) (a frequency-domain code) of a Computer-Generated Constant Amplitude Zero Auto Correlation (CG-CAZAC) sequence and an Orthogonal Cover (OC) or Orthogonal Cover Code (OCC) (a time-domain spreading code). The OC includes, for example, a Walsh/DFT orthogonal code. If the number of CSs is 6 and the number of OCs is 3, a total of 18 UEs may be multiplexed in the same Physical Resource Block (PRB) based on a single antenna. An OC sequence w0, w1, w2 and w3 is applicable to a time domain (after FFT modulation) or to a frequency domain (before FFT modulation). PUCCH Format 1 for transmitting SR information is the same as PUCCH Formats 1a and 1b in slot-level structure and different from PUCCH Formats 1a and 1b in modulation scheme.

PUCCH resources comprised of a CS, an OC, and a PRB may be allocated to a UE by Radio Resource Control (RRC) signaling, for transmission of SR information and an ACK/NACK for Semi-Persistent Scheduling (SPS). As described before with reference to FIG. 12, PUCCH resources may be implicitly allocated to a UE using the lowest CCE index of a PDCCH corresponding to a PDSCH or the lowest CCE index of a PDCCH for SPS release, for dynamic ACK/NACK (or an ACK/NACK for non-persistent scheduling) feedback or an ACK/NACK feedback for a PDCCH indicating SPS release.

Figure 15:
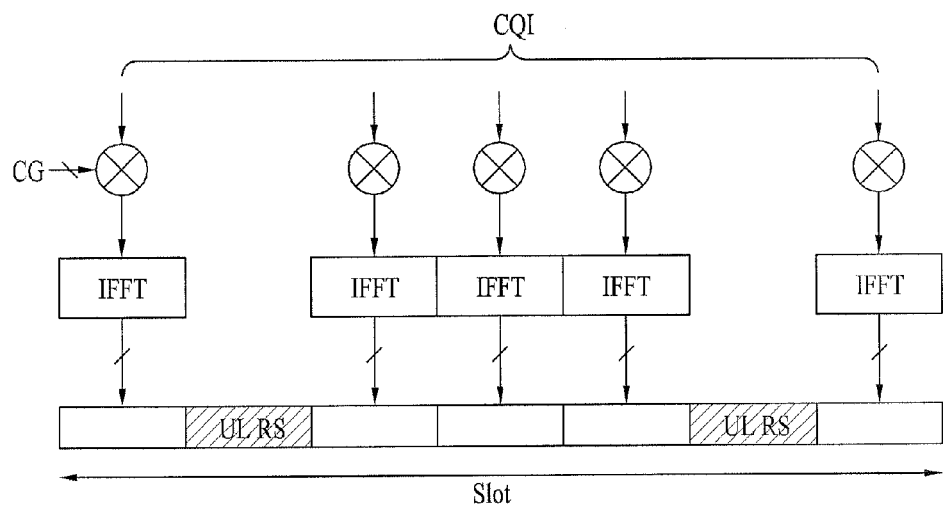
FIG. 15 illustrates PUCCH Format 2/2a/2b in case of a normal CP.
Figure 16:
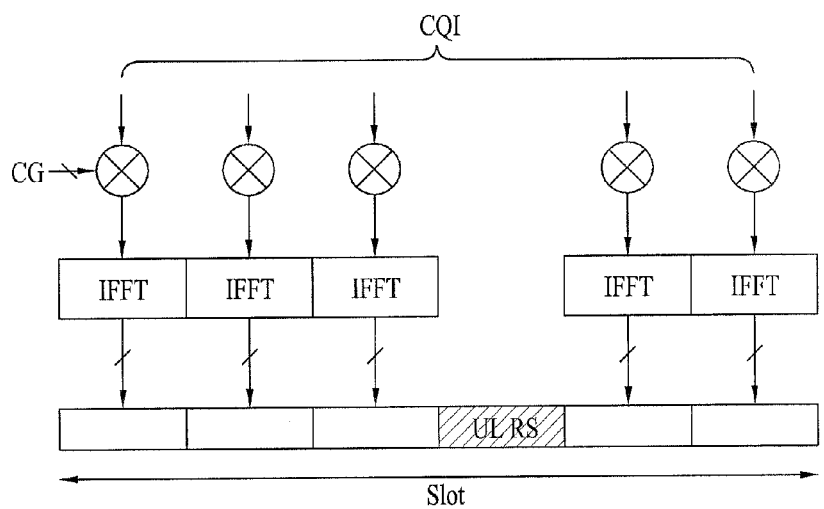
FIG. 16 illustrates PUCCH Format 2/2a/2b in case of an extended CP.

FIG. 15 illustrates PUCCH Format 2/2a/2b in case of a normal CP and FIG. 16 illustrates PUCCH Format 2/2a/2b in case of an extended CP. Referring to FIGS. 15 and 16, one subframe includes 10 QPSK symbols except for an RS symbol in case of a normal CP. Each QPSK symbol is spread with a CS in the frequency domain and then mapped to a corresponding SC-FDMA symbol. SC-FDMA symbol-level CS hopping may be applied to randomize inter-cell interference. An RS may be multiplexed by Code Division Multiplexing (CDM) using a CS. For example, if the number of available CSs is 12 or 6, 12 or 6 UEs may be multiplexed in the same PRB. That is, a plurality of UEs may be multiplexed using CS+OC+PRB and CS+PRB in PUCCH Formats 1/1a/1b and 2/2a/2b, respectively.

Length-4 and length-3 OCs for PUCCH Format 1/1a/1b are illustrated in Table 4 and Table 5 below.

TABLE 4

| Sequence Index | OC |
|---|---|
| 0 | [+1 +1 +1 +1] |
| 1 | [+1 −1 +1 −1] |
| 2 | [+1 −1 −1 +1] |

TABLE 5

| Sequence Index | OC |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

OCs for RSs in PUCCH Format 1/1a/1b are given in Table 6 below.

TABLE 6

| Sequence Index | Normal CP | Extended CP |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 17 illustrates ACK/NACK channelization for PUCCH Formats 1a and 1b. In FIG. 17, $\Delta_{shift}^{PUCCH} = 2$.

Figure 18:
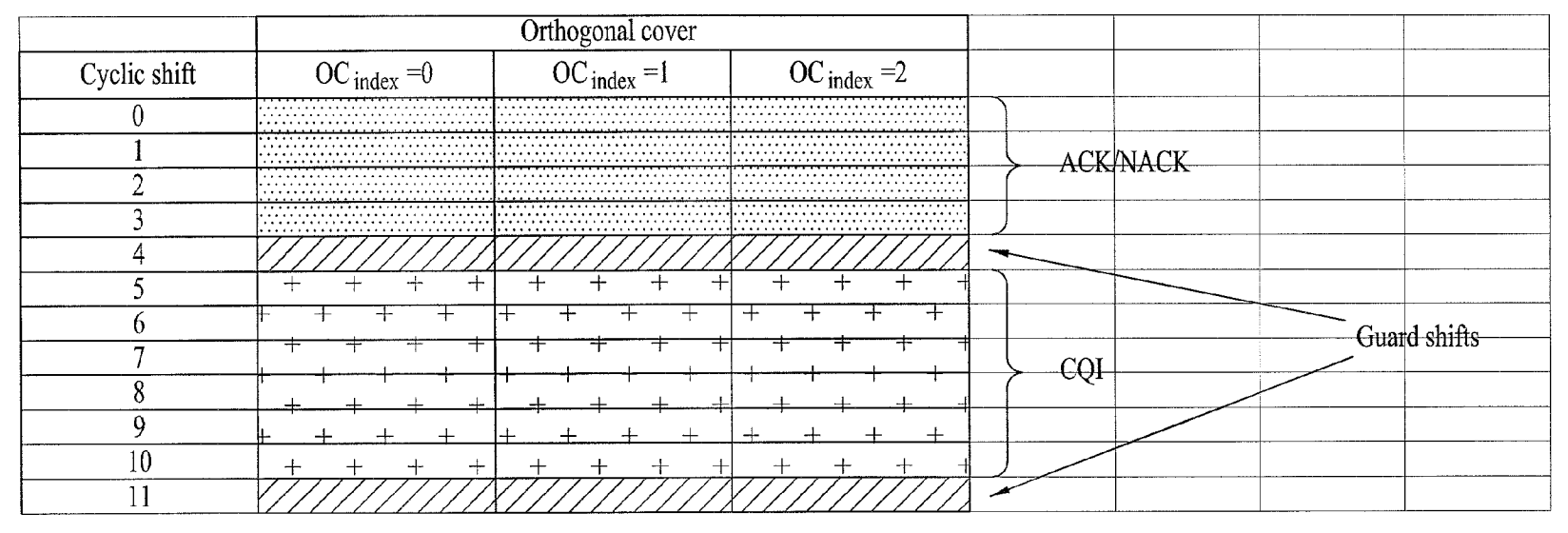

FIG. 18 illustrates channelization for a hybrid structure of PUCCH Format 1/1a/1b and PUCCH Format 2/2a/2b in the same PRB.

CS hopping and OC re-mapping may be applied as follows.

(1) Symbol-based cell-specific CS hopping for randomization of inter-cell interference (2) Slot-level CS/OC re-mapping 1) For randomization of inter-cell interference 2) Slot-based approach for mapping between an ACK/NACK channel and a resources Meanwhile, a resource $n_r$ for PUCCH Format 1/1a/1b includes the following combinations.

(1) CS (identical to DFT OC in symbol level) ($n_{cs}$)
(2) OC (OC in slot level) ($n_{oc}$)
(3) Frequency RB ($n_{rb}$)

Assuming that indexes of a CS, an OC, and an RB are denoted by $n_{cs}$, $n_{oc}$, and $n_{rb}$, respectively, a representative index $n_r$ includes $n_{cs}$, $n_{oc}$, and $n_{rb}$ where $n_r$ satisfies $n_r=(n_{cs}, n_{oc}, n_{rb})$.

A combination of an ACK/NACK and a CQI, PMI and RI, and a combination of an ACK/NACK and a CQI may be delivered through PUCCH Format 2/2a/2b. Reed Muller (RM) channel coding may be applied.

For example, channel coding for an uplink CQI in the LTE system is described as follows. A bit stream $a_0, a_1, a_2, a_3, \ldots, a_{A-1}$ is channel coded using a (20, A) RM code. Table 7 lists base sequences for the (20, A) code. $a_1$ and $a_{A-1}$ denote the Most Significant Bit (MSB) and Least Significant Bit (LSB), respectively. In case of an extended CP, up to 11 bits can be transmitted except for simultaneous transmission of a CQI and an ACK/NACK. A bit stream may be encoded to 20 bits using an RM code and then modulated by QPSK. Before QPSK modulation, the coded bits may be scrambled.

TABLE 7

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 0 | 0 | 1 | 0 | 1 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 0 | 0 | 0 | 0 | 0 | 0 |
| 19 | 1 | 0 | 0 | 0 | 0 | 1 | 1 | 0 | 0 | 0 | 0 | 0 | 0 |

Channel-coded bits $b_0, b_1, b_2, b_3, \ldots, b_{B-1}$ may be generated by Equation 2.

$$b_i = \sum_{n=0}^{A-1} (o_n \cdot M_{i,n}) \bmod 2 \quad \text{[Equation 2]}$$

where $i=0, 1, 2, \ldots, B-1$.

Table 8 illustrates a UCI field for feedback of a wideband report (a single antenna port, transmit diversity, or open loop spatial multiplexing PDSCH) CQI.

TABLE 8

| Field | Bandwidth |
|---|---|
| Wideband CQI | 4 |

Table 9 illustrates a UCI field for feedback of a wideband CQI and a PMI. This field reports transmission of a closed loop spatial multiplexing PDSCH.

TABLE 9

| | Bandwidth | | | |
|---|---|---|---|---|
| | 2 antenna ports | | 4 antenna ports | |
| Field | Rank = 1 | Rank = 2 | Rank = 1 | Rank > 1 |
| wideband CQI | 4 | 4 | 4 | 4 |
| Spatial differential CQI | 0 | 3 | 0 | 3 |
| PMI | 2 | 1 | 4 | 4 |

Table 10 illustrates a UCI field for RI feedback for a wideband report.

TABLE 10

| | Bit widths | | |
|---|---|---|---|
| | | 4 antenna ports | |
| Field | 2 antenna ports | Up to 2 layers | Up to 4 layers |
| RI | 1 | 1 | 2 |

Figure 19:
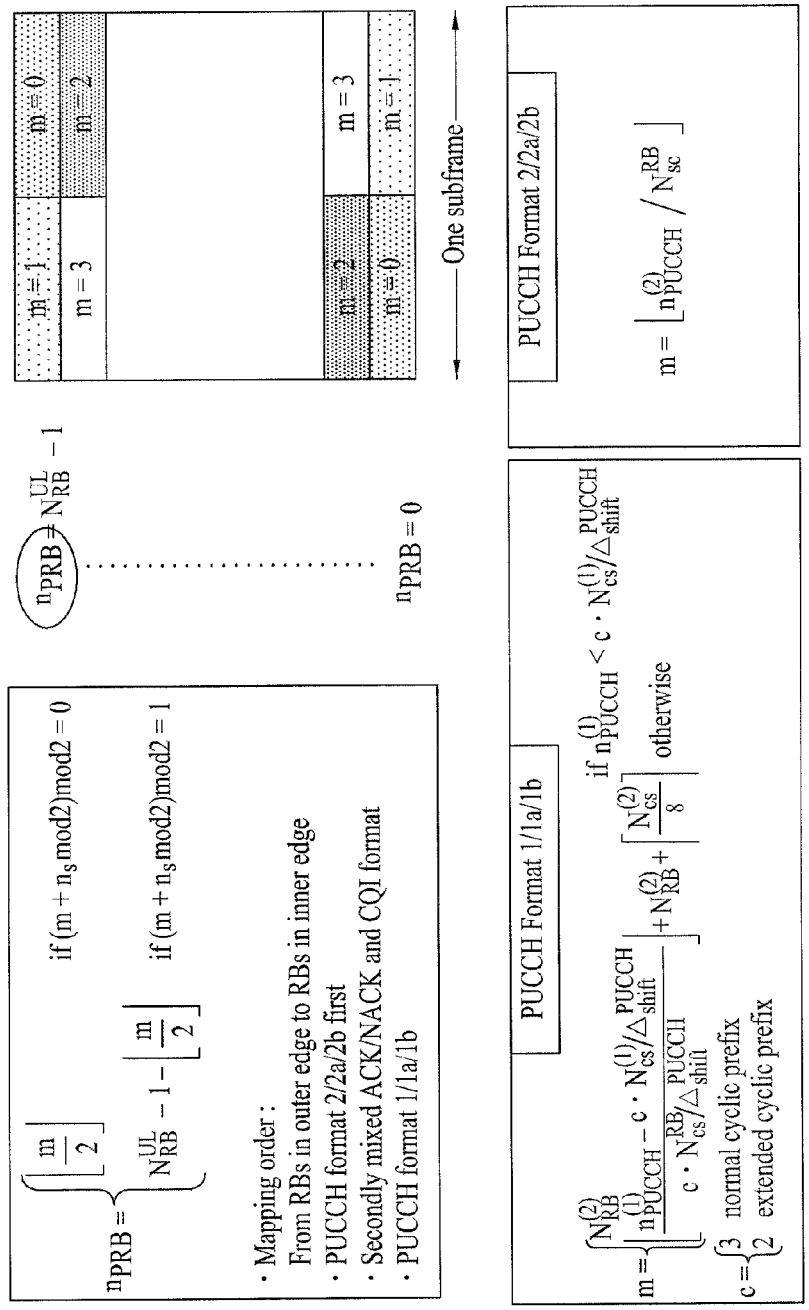
FIG. 19 illustrates PRB allocation.

FIG. 19 illustrates PRB allocation. Referring to FIG. 19, a PRB may be used to carry a PUCCH in slot $n_s$.

A multi-carrier system or Carrier Aggregation (CA) system is a system using a plurality of carriers each having a narrower bandwidth than a target bandwidth in order to support a broadband. When a plurality of carriers each having a narrower bandwidth than a target bandwidth is aggregated, the bandwidth of the aggregated carriers may be limited to a bandwidth used in a legacy system in order to ensure backward compatibility with the legacy system. For example, the legacy LTE system supports bandwidths of 1.4, 3, 5, 10, 15, and 20 MHz and an LTE-A system evolved from an LTE system may support a broader bandwidth than 20 MHz using only the bandwidths supported by the LTE system. Alternatively, CA may be supported by defining a new bandwidth irrespective of the bandwidths used in the legacy system. The term multi-carrier is interchangeably used with CA and bandwidth aggregation. In addition, CA includes both contiguous CA and non-contiguous CA.

Figure 20:
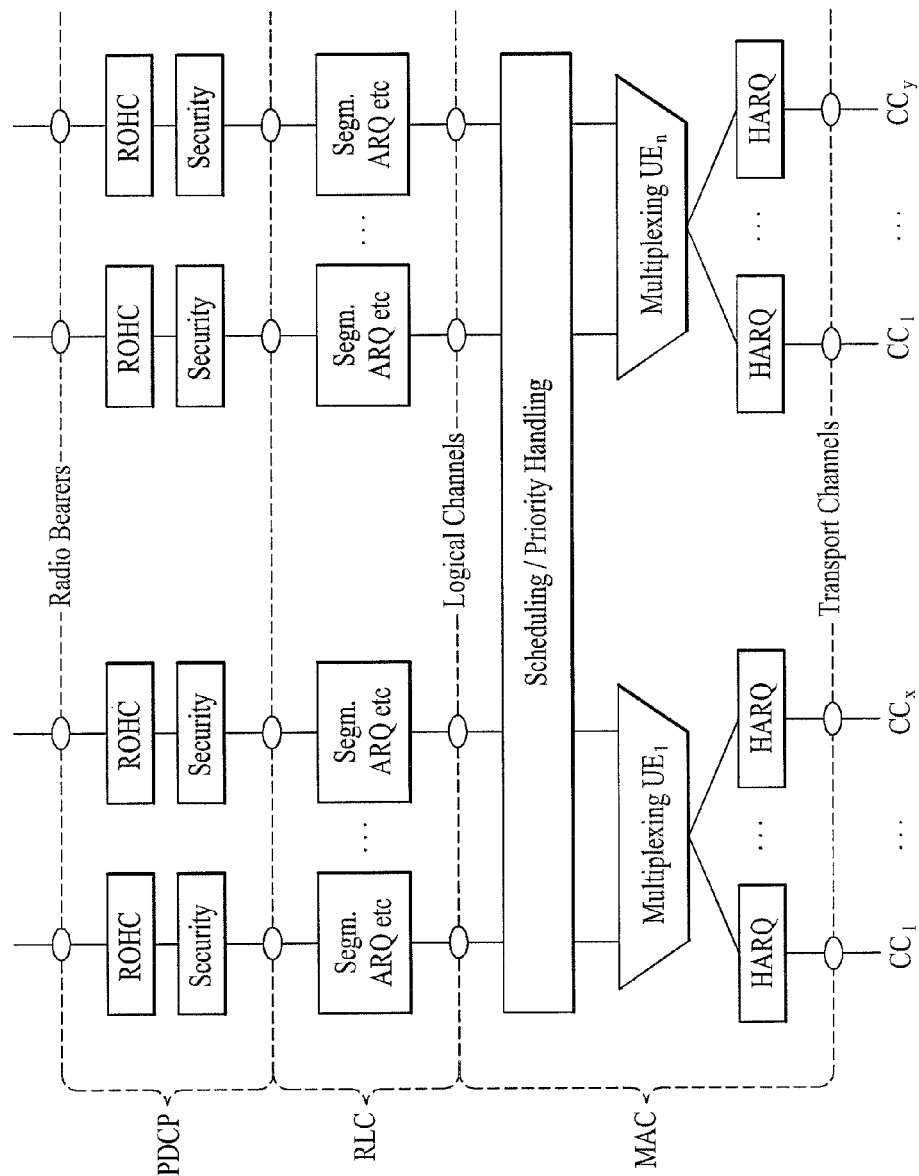
FIG. 20 illustrates a concept of DL CC management in a BS.
Figure 21:
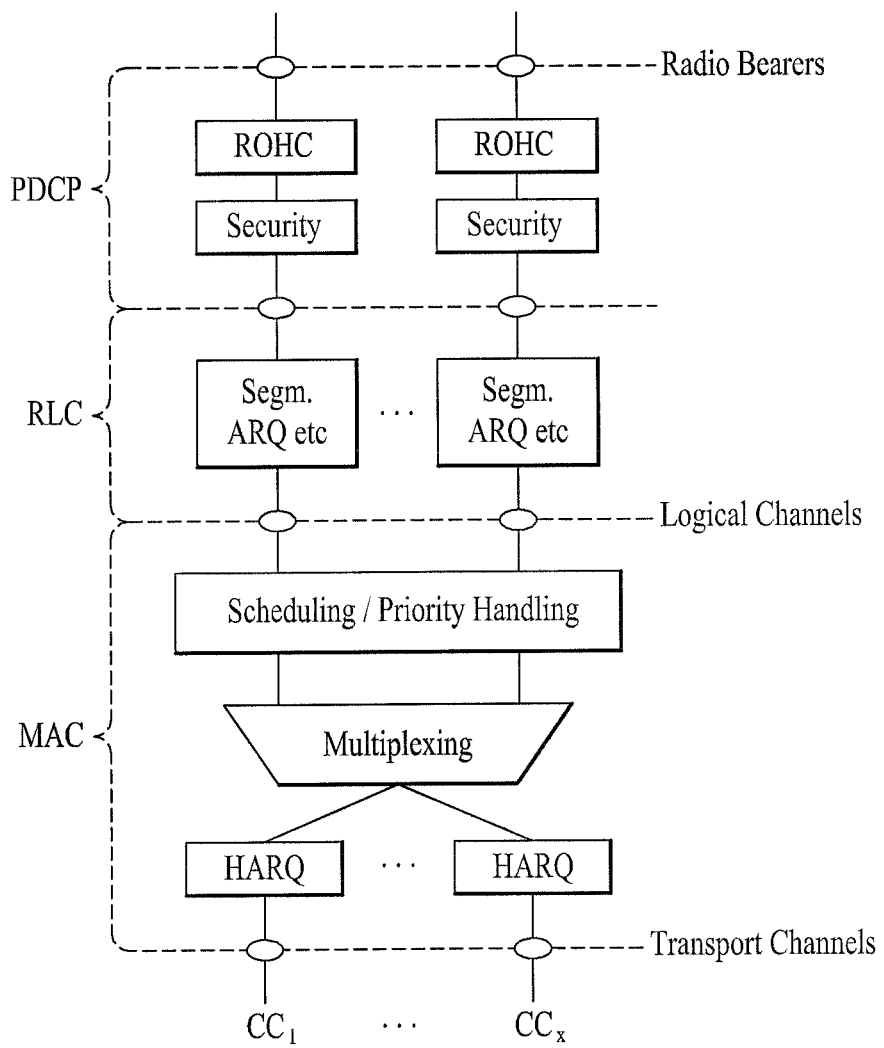
FIG. 21 illustrates a concept of UL CC management in a UE.

FIG. 20 illustrates a concept of downlink (DL) CC management in a BS and FIG. 21 illustrates a concept of uplink (UL) CC management in a UE. For convenience of description, a higher layer will be simply referred to as a MAC in FIGS. 19 and 20.

Figure 22:
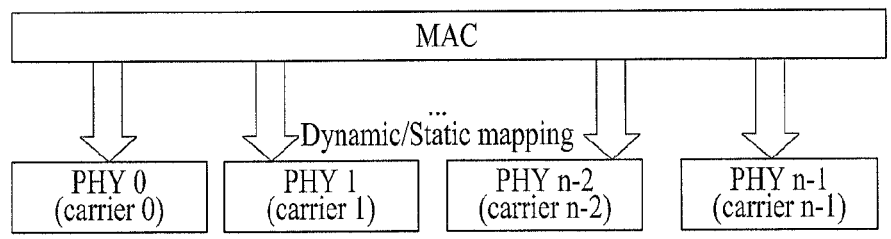
FIG. 22 illustrates a concept of multi-carrier management of one MAC in a BS.
Figure 23:
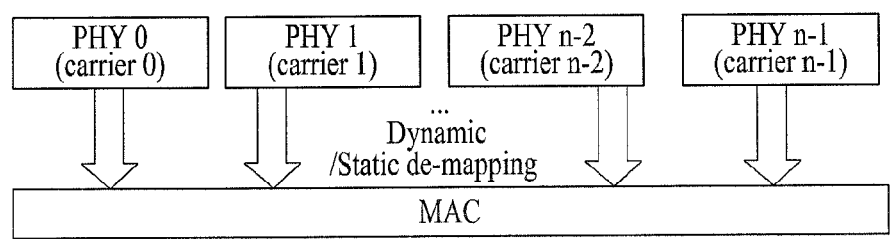
FIG. 23 illustrates a concept of multi-carrier management of one MAC in a UE.

FIG. 22 illustrates a concept of multi-carrier management of one MAC in a BS and FIG. 23 illustrates multi-carrier management of one MAC in a UE.

Referring to FIGS. 22 and 23, one MAC manages and operates one or more frequency carriers to perform transmission and reception. Since frequency carriers managed by a single MAC do not need to be contiguous, this multi-carrier management scheme is more flexible in terms of resource management. In FIGS. 22 and 23, one Physical layer (PHY) refers to one CC, for convenience of description. Here, one PHY does not always mean an independent Radio Frequency (RF) device. Although one independent RF device generally means one PHY, it may include a plurality of PHYs.

Figure 24:
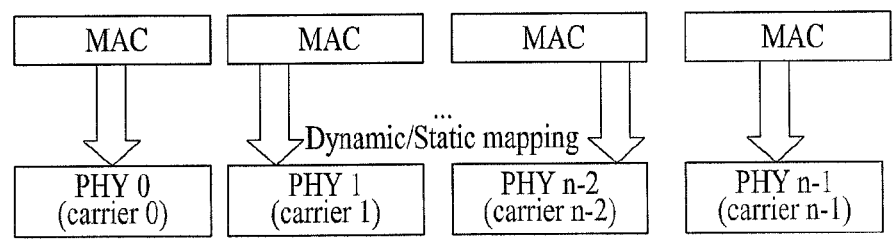
FIG. 24 illustrates a concept of multi-carrier management of a plurality of MACs in a BS.
Figure 25:
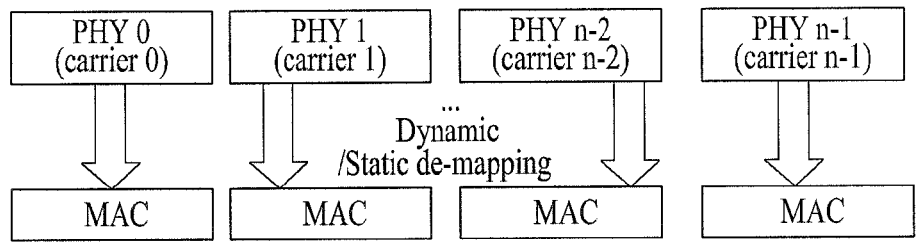
FIG. 25 illustrates a concept of multi-carrier management of a plurality of MACs in a UE.
Figure 26:
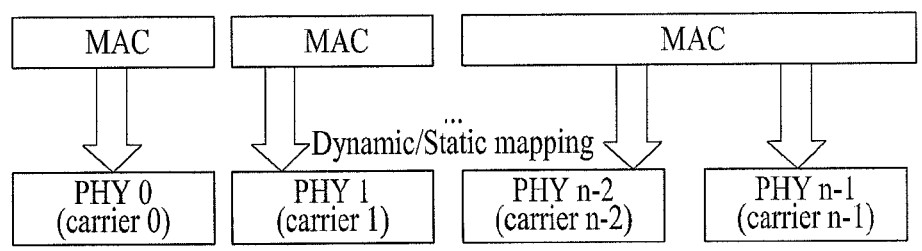
FIG. 26 illustrates another a concept of multi-carrier management of a plurality of MACs in a BS.
Figure 27:
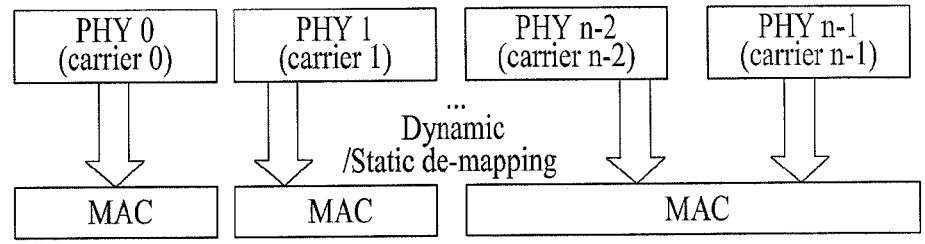
FIG. 27 illustrates another a concept of multi-carrier management of a plurality of MACs in a UE.

FIG. 24 illustrates a concept of multi-carrier management of a plurality of MACs in a BS, FIG. 25 illustrates a concept of multi-carrier management of a plurality of MACs in a UE, FIG. 26 illustrates another concept of multi-carrier management of a plurality of MACs in a BS, and FIG. 27 illustrates another concept of multi-carrier management of a plurality of MACs in a UE.

In addition to the structures illustrated in FIGS. 22 and 23, a plurality of MACs rather than one MAC may control a plurality of carriers, as illustrated in FIGS. 24 to 27.

Each MAC may control one carrier in a one-to-one correspondence as illustrated in FIGS. 24 and 25, whereas each MAC may control one carrier in a one-to-one correspondence, for some carriers and one MAC may control one or more of the remaining carriers as illustrated in FIGS. 26 and 27.

The above-described system uses a plurality of carriers from one to N carriers and the carriers may be contiguous or non-contiguous irrespective of downlink or uplink. A TDD system is configured to use N carriers such that downlink transmission and uplink transmission are performed on each carrier, whereas an FDD system is configured to use a plurality of carriers for each of downlink transmission and uplink transmission. The FDD system may support asymmetrical CA in which different numbers of carriers and/or carriers having different bandwidths are aggregated for downlink and uplink.

When the same number of CCs is aggregated for downlink and uplink, all CCs can be configured to be compatible with the legacy system. However, CCs without compatibility are not excluded from the present invention.

Figure 28:
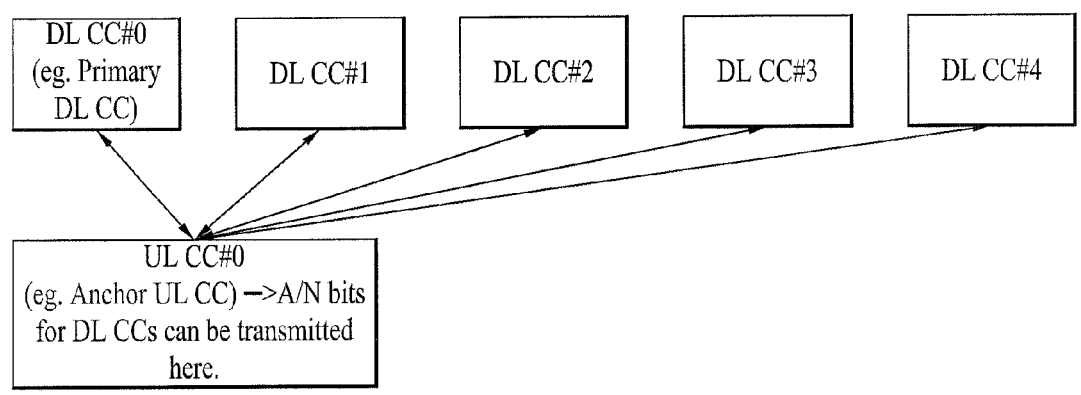
FIG. 28 illustrates asymmetrical Carrier Aggregation (CA) in which five DL CCs are linked to one UL CC.

FIG. 28 illustrates exemplary asymmetrical CA in which five DL CCs are linked to a single UL CC. This asymmetrical CA may be set from the perspective of transmitting UCI. That is, DL CC-UL CC linkage for UCI may be set to be different from DL CC-UL CC linkage for data. For the convenience, if it is assumed that each DL CC can carry up to two codewords and the number of ACKs/NACKs for each CC depends on the maximum number of codewords set per CC (for example, if a BS sets up to two codewords for a specific CC, even though a specific PDCCH uses only one codeword on the CC, ACKs/NACKs for the CC are set to 2 which is the same as the maximum number of codewords), at least two UL ACK/NACK bits are needed for each DL CC. In this case, to transmit ACKs/NACKs for data received on five DL CCs on a single UL CC, at least 10 ACK/NACK bits are needed. If a Discontinuous Transmission (DTX) state is also to be indicated for each DL CC, at least 12 bits (=$5^6$=3125=11.61 bits) are required for ACK/NACK transmission. Since up to two ACK/NACK bits are available in the conventional PUCCH Formats 1a and 1b, this structure cannot transmit increased ACK/NACK information. While CA is given as an example of a cause to increase the amount of UCI, this situation may also occur due to an increase in the number of antennas and the existence of a backhaul subframe in a TDD system and a relay system. Similarly to ACK/NACK transmission, the amount of control information to be transmitted is also increased when control information related to a plurality of DL CCs is transmitted on a single UL CC. For example, transmission of CQI/PMI/RI information related to a plurality of DL CCs may increase UCI payload. While ACK/NACK information related to codewords is described in the present invention by way of example, it is obvious that a transmission block corresponding to a codeword is present and the same principle is applicable to ACK/NACK information for transmission blocks.

In FIG. 28, a UL anchor CC (also referred to as a UL PCC or a UL primary CC) is a CC on which a PUCCH or UCI is transmitted and may be determined cell-specifically/UE-specifically. A DTX state may be fed back explicitly or may be fed back so as to have the same state with a NACK.

In LTE-A, the concept of a cell is used to manage radio resources. A cell is defined as a combination of downlink resources and uplink resources and the uplink resources are not indispensable elements. Therefore, a cell may be composed of downlink resources only or both downlink resources and uplink resources. If CA is supported, the linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only is present for a UE in an RRC_CONNECTED state, for which CA is not configured or which does not support CA. On the other hand, one or more serving cells are present, including a PCell and all SCells, for a UE in RRC_CONNECTED state, for which CA is configured. For CA, a network may configure one or more SCells in addition to an initially configured PCell, for a UE supporting CA during a connection setup procedure after an initial security activation procedure is initiated. Therefore, PCC is interchangeably used with PCell, primary (radio) resources, and primary frequency resources. Similarly, SCC is interchangeably used with SCell, secondary (radio) resources, and secondary frequency resources.

Hereinafter, a method for efficiently transmitting increased UCI will be proposed with reference to the drawings. Specifically, a new PUCCH format/signal processing operation/resource allocation method for transmitting increased UCI are proposed. The new PUCCH format proposed by the present invention is referred to as CA PUCCH Format, or PUCCH Format 3 considering that up to PUCCH Format 2 is defined in legacy LTE Release 8/9. The technical features of the proposed PUCCH format may be easily applied to any physical channel (e.g. a PUSCH) that can deliver UCI in the same manner or in a similar manner. For example, an embodiment of the present invention is applicable to a periodic PUSCH structure for periodically transmitting control information or an aperiodic PUSCH structure for aperiodically transmitting control information.

The following drawings and embodiment of the present invention will be described, focusing on the case of using the UCI/RS symbol structure of the legacy LTE PUCCH Format 1/1a/1b (a normal CP) as a subframe/slot level UCI/RS symbol structure applied to PUCCH Format 3. However, the subframe/slot level UCI/RS symbol structure of PUCCH Format 3 is exemplarily defined for convenience and the present invention is not limited to such a specific structure. The number and positions of UCI/RS symbols may be changed freely in PUCCH Format 3 of the present invention according to system design. For example, PUCCH Format 3 according to an embodiment of the present invention may be defined using the RS symbol structure of the legacy LTE PUCCH Format 2/2a/2b.

PUCCH Format 3 according to the embodiment of the present invention may be used to transmit UCI of any type or size. For example, information such as an HARQ ACK/NACK, a CQI, a PMI, an RI, and an SR may be transmitted in PUCCH Format 3 according to the embodiment of the present invention may. This information may have a payload of any size. For convenience of description, the following description will focus on transmission of ACK/NACK information in PUCCH Format 3 according to the present invention.

FIGS. 29 to 32 illustrate the structure of PUCCH Format 3 that can be used in the present invention and a signal processing operation for PUCCH Format 3. Especially, FIGS. 29 to 32 illustrate the structure of a DFT-based PUCCH format. According to the DFT-based PUCCH structure, a PUCCH is DFT-precoded and a time-domain OC is applied thereto at an SC-FDMA level prior to transmission. Hereinafter, the DFT-based PUCCH format will be referred to as PUCCH Format 3.

Figure 29:
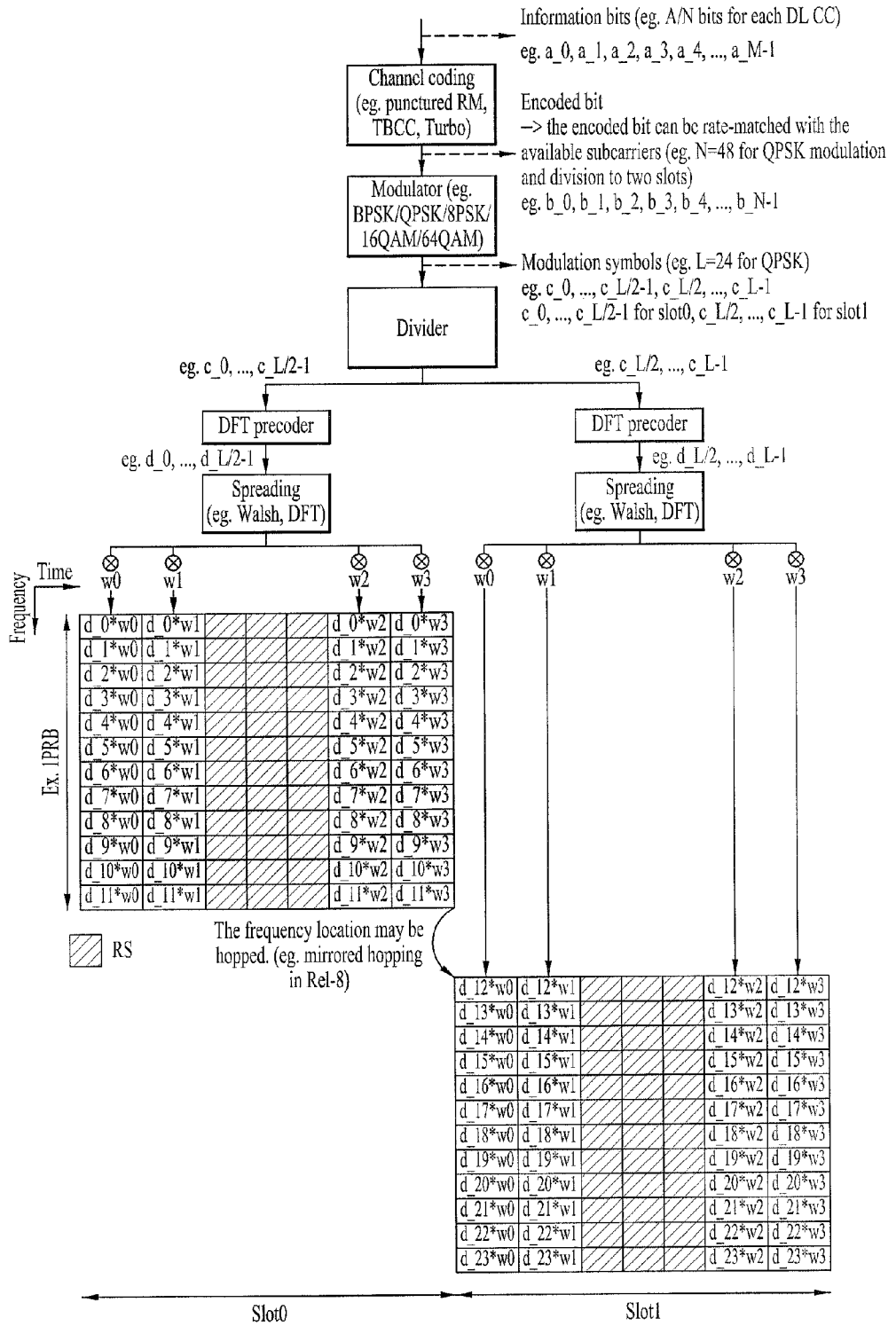
FIGS. 29 to 32 illustrate the structure of PUCCH Format 3 and a signal processing operation for PUCCH Format 3, to which the present invention is applied.

FIG. 29 illustrates an exemplary structure of PUCCH Format 3 using an OC of SF=4. Referring to FIG. 29, a channel coding block channel-encodes transmission bits $a\_0, a\_1, \ldots, a\_M-1$ (e.g. multiple ACK/NACK bits) and generates coded bits (or a codeword), $b\_0, b\_1, \ldots, b\_N-1$. M is the size of transmission bits and N is the size of coded bits. The transmission bits include UCI, for example, multiple ACKs/NACKs for a plurality of data (or PDSCHs) received on a plurality of DL CCs. Herein, the transmission bits $a\_0, a\_1, \ldots, a\_M-1$ are jointly encoded irrespective of the type/number/size of UCI constituting the transmission bits. For example, if the transmission bits include multiple ACKs/NACKs for a plurality of DL CCs, channel coding is performed on the entire bit information, rather than per DL CC or per ACK/NACK bit. A single codeword is generated by channel coding. Channel coding includes, but is not limited to, repetition, simplex coding, RM coding, punctured RM coding, Tail-Biting Convolutional Coding (TBCC), Low-Density Parity-Check (LDPC) coding, or turbo coding. Although not shown, the coded bits may be rate-matched, in consideration of modulation order and the amount of resources. The rate matching function may be partially incorporated into the channel coding block or implemented in a separate functional block. For example, the channel coding block may obtain a single codeword by performing (32, 0) RM coding with respect to a plurality of control information and may perform cyclic buffer rate-matching.

A modulator generates modulation symbols $c\_0, c\_1, \ldots, c\_L-1$ by modulating the coded bits $b\_0, b\_1, \ldots, b\_M-1$. L is the size of modulation symbols. A modulation scheme is performed by changing the amplitude and phase of a transmission signal. The modulation scheme may be n-Phase Shift Keying (n-PSK) or n-Quadrature Amplitude Modulation (QAM) (where n is an integer of 2 or more). Specifically, the modulation scheme includes Binary PSB (BPSK), Quadrature (QPSK), 8-PSK, QAM, 16-QAM, or 64-QAM.

A divider divides the modulation symbols $c\_0, c\_1, \ldots, c\_L-1$ into slots.

The order/pattern/scheme of dividing modulation symbols into slots is not limited to a specific one. For instance, the divider may divide the modulation symbols into slots, sequentially starting from the first modulation symbol (localized scheme). In this case, the modulation symbols $c\_0, c\_1, \ldots, c\_L/2-1$ may be allocated to slot 0 and the modulation symbols $c\_L/2, c\_L/2+1, \ldots, c\_L-1$ may be allocated to slot 1. When the modulation symbols are divided into the slots, the modulation symbols may be interleaved (or permuted). For example, even-numbered modulation symbols may be allocated to slot 0 and odd-numbered modulation symbols may be allocated to slot 1. The division process and the modulation process are interchangeable in order.

A DFT precoder performs DFT precoding (e.g. 12-point DFT) with respect to the modulation symbols divided into the slots in order to generate a single carrier waveform. Referring to FIG. 29, the modulation symbols $c\_0, c\_1, \ldots, c\_L/2-1$ allocated to slot 0 are DFT-precoded to DFT symbols $d\_0, d\_1, \ldots, d\_L/2-1$ and the modulation symbols $c\_L/2, c\_L/2+1, \ldots, c\_L-1$ allocated to slot 1 are DFT-precoded to DFT symbols $d\_L/2, d\_L/2+1, \ldots, d\_L-1$. DFT precoding may be replaced with another linear operation (e.g. Walsh precoding).

A spreading block spreads the DFT-precoded signals at an SC-FDMA symbol level (in the time domain). SC-FDMA symbol-level time-domain spreading is performed using a spreading code (sequence). The spreading code includes a quasi-orthogonal code and an orthogonal code. The quasi-orthogonal code includes, but is not limited to, a Pseudo Noise (PN) code. The orthogonal code includes, but is not limited to, a Walsh code and a DFT code. While the orthogonal code is described as a typical example of the spreading code for convenience of description, the orthogonal code may be replaced with the quasi-orthogonal code. The maximum value of a spreading code size or a Spreading Factor (SF) is limited by the number of SC-FDMA symbols used for transmitting control information. For example, if four SC-FDMA symbols are used for transmission of control information in one slot, an orthogonal code of length 4, w0, w1, w2, w3 can be used in each slot. The SF means the degree of spreading of control information and may be related to the multiplexing order or antenna multiplexing order of a UE. The SF may be changed to 1, 2, 3, 4, . . . depending on system requirements. The SF may be predefined between a BS and a UE or the BS may indicate an SF to the UE by DCI or RRC signaling. For example, if one of SC-FDMA symbols for control information is punctured to transmit an SRS, a spreading code with a decreased SF (e.g. SF=3 instead of SF=4) may be applied to the control information in a corresponding slot.

A signal generated from the above operation is mapped to subcarriers in a PRB and converted into a time-domain signal by IFFT. A CP is added to the time-domain signal and the generated SC-FDMA symbols are transmitted through an RF end.

On the assumption that ACKs/NACKs are transmitted for five DL CCs, each operation will be described in more detail. If each DL CC can transmit two PDSCHs, ACK/NACK bits for the PDSCHs may be 12 bits, including a DTX state. Under the assumption of QPSK and time spreading of SF=4, the size of a coding block (after rate matching) may be 48 bits. The coded bits are modulated to 24 QPSK symbols and the QPSK symbols are divided into two slots each including 12 QPSK symbols. The 12 QPSK symbols in each slot are converted into 12 DFT symbols by 12-point DFT. The 12 DFT symbols in each slot are spread to four SC-FDMA symbols using a spreading code of SF=4 in the time domain and then mapped. Since 12 bits are transmitted on [2 bits×12 subcarriers×8 SC-FDMA symbols], the coding rate is 0.0625 (=12/192). If SF=4, a maximum of four UEs may be multiplexed per PRB.

Figure 30:
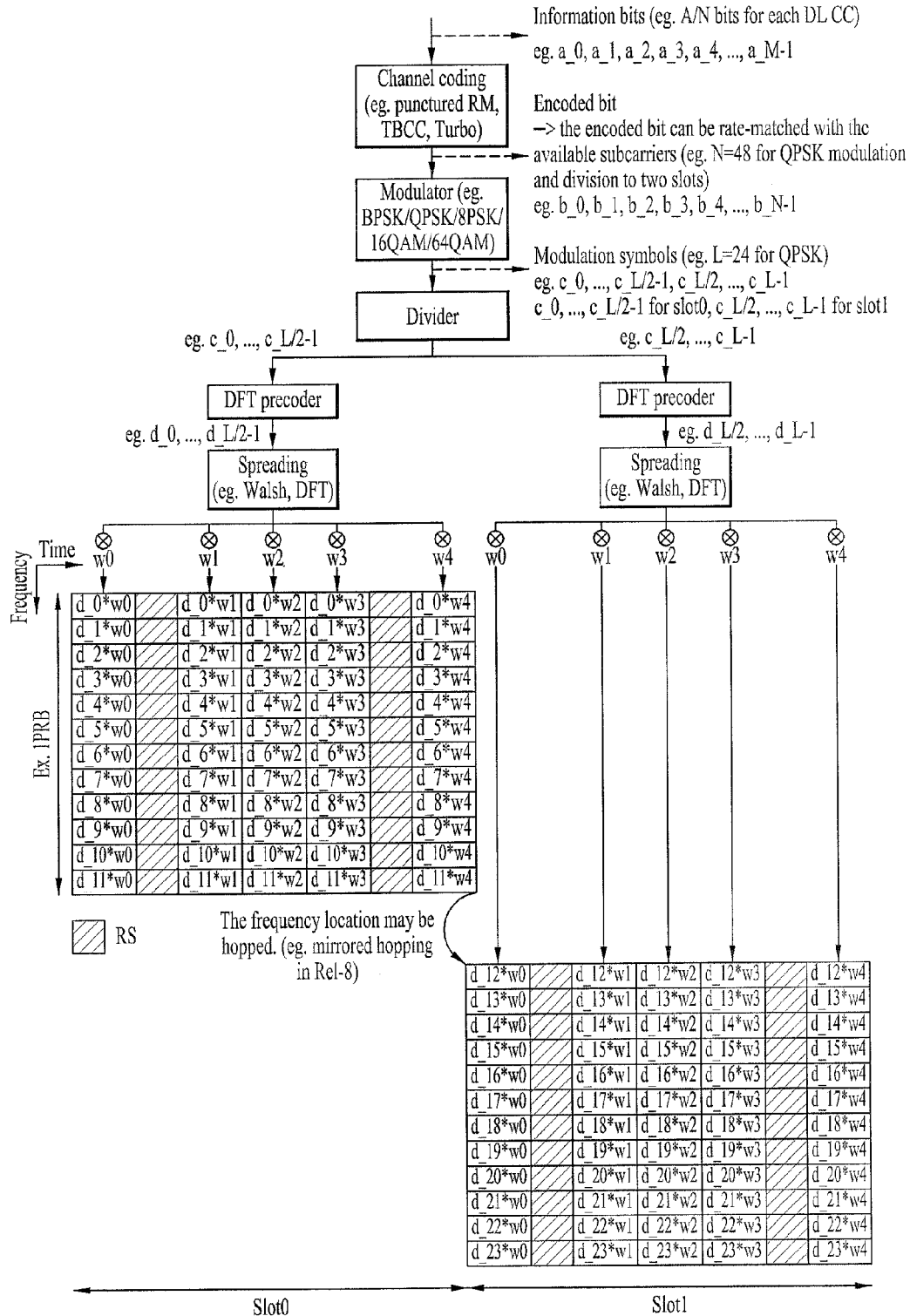

FIG. 30 illustrates an exemplary structure of PUCCH Format 3 using an OC of SF=5.

The basic signal processing operation is performed in the same manner as described with reference to FIG. 29 except for the number and positions of UCI SC-FDMA symbols and RS SC-FDMA symbols. A spreading block may be applied in advance at the front end of the DFT precoder.

In FIG. 30, RSs may use the same structure as those used in the LTE system. For example, a base sequence may be cyclically shifted. The multiplexing capacity of a data part is 5 due to SF=5. However, the multiplexing capacity of an RS part is determined by a CS interval $\Delta_{shift}^{PUCCH}$. For example, the multiplexing capacity may be $12/\Delta_{shift}^{PUCCH}$. In this case, the multiplexing capacities for the cases in which $\Delta_{shift}^{PUCCH}=1$, $\Delta_{shift}^{PUCCH}=2$, and $\Delta_{shift}^{PUCCH}=3$ are 12, 6, and 4, respectively. In FIG. 30, while the multiplexing capacity of the data part is 5 due to SF=5, the multiplexing capacity of the RS part is 4 in case of $\Delta_{shift}^{PUCCH}$. Therefore, an overall multiplexing capacity may be limited to the smaller of the two values, 4.

Figure 31:
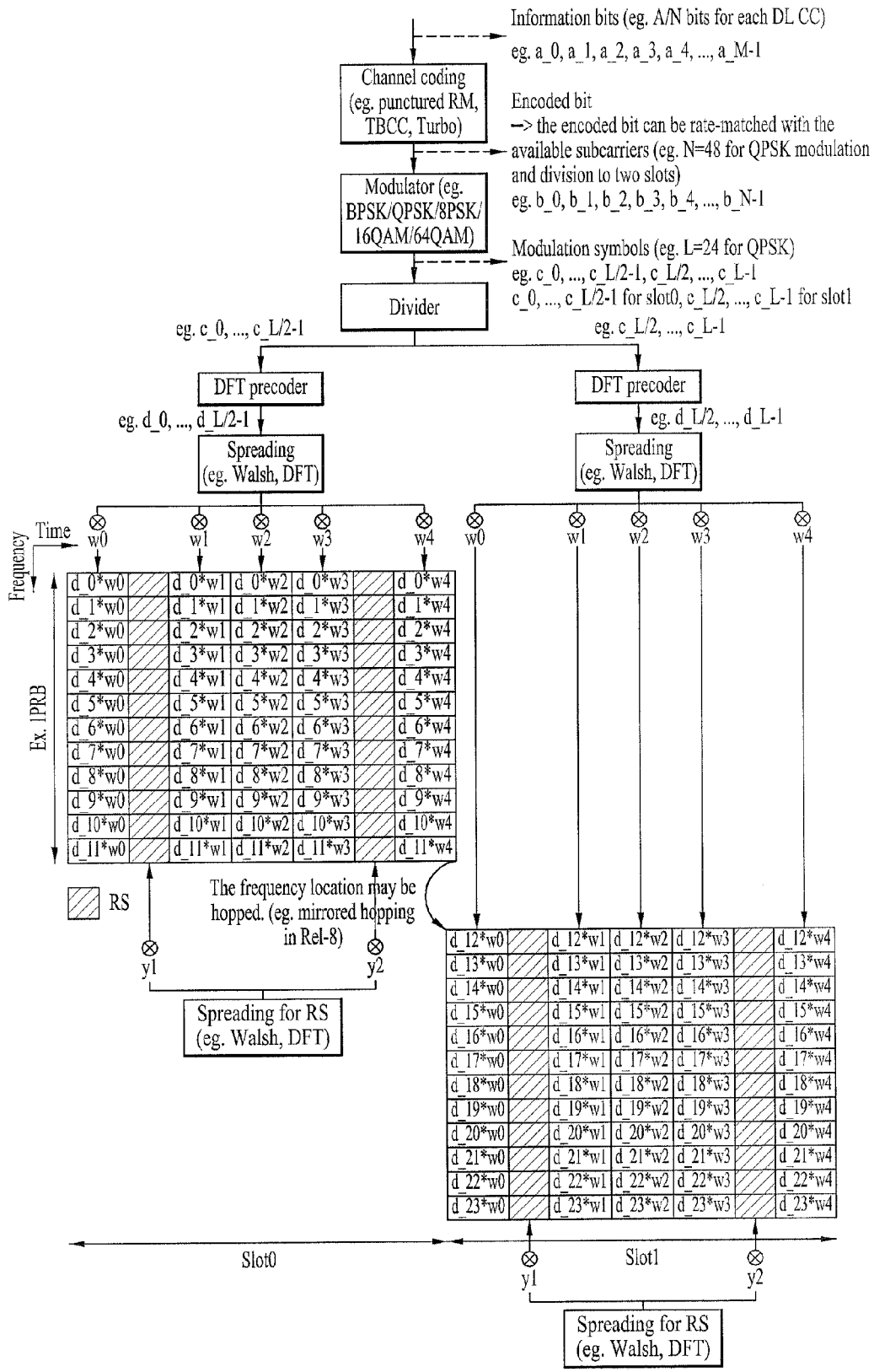

FIG. 31 illustrates an exemplary structure of PUCCH Format 3 that can increase a multiplexing capacity at a slot level.

An overall multiplexing capacity can be increased by applying SC-FDMA symbol-level spreading described with reference to FIGS. 29 and 30 to RSs. Referring to FIG. 31, the multiplexing capacity is doubled by applying a Walsh cover (or a DFT code cover) within a slot. Then, the multiplexing capacity is 8 even in case of $\Delta_{shift}^{PUCCH}$, thereby preventing the multiplexing capacity of a data part from decreasing. In FIG. 31, [y1 y2]=[1 1], [y1 y2]=[1 −1], or linear transformation thereof (e.g. [j j] [j −j], [1 j] [1 −j], etc.) may be used for an OC for RSs.

Figure 32:
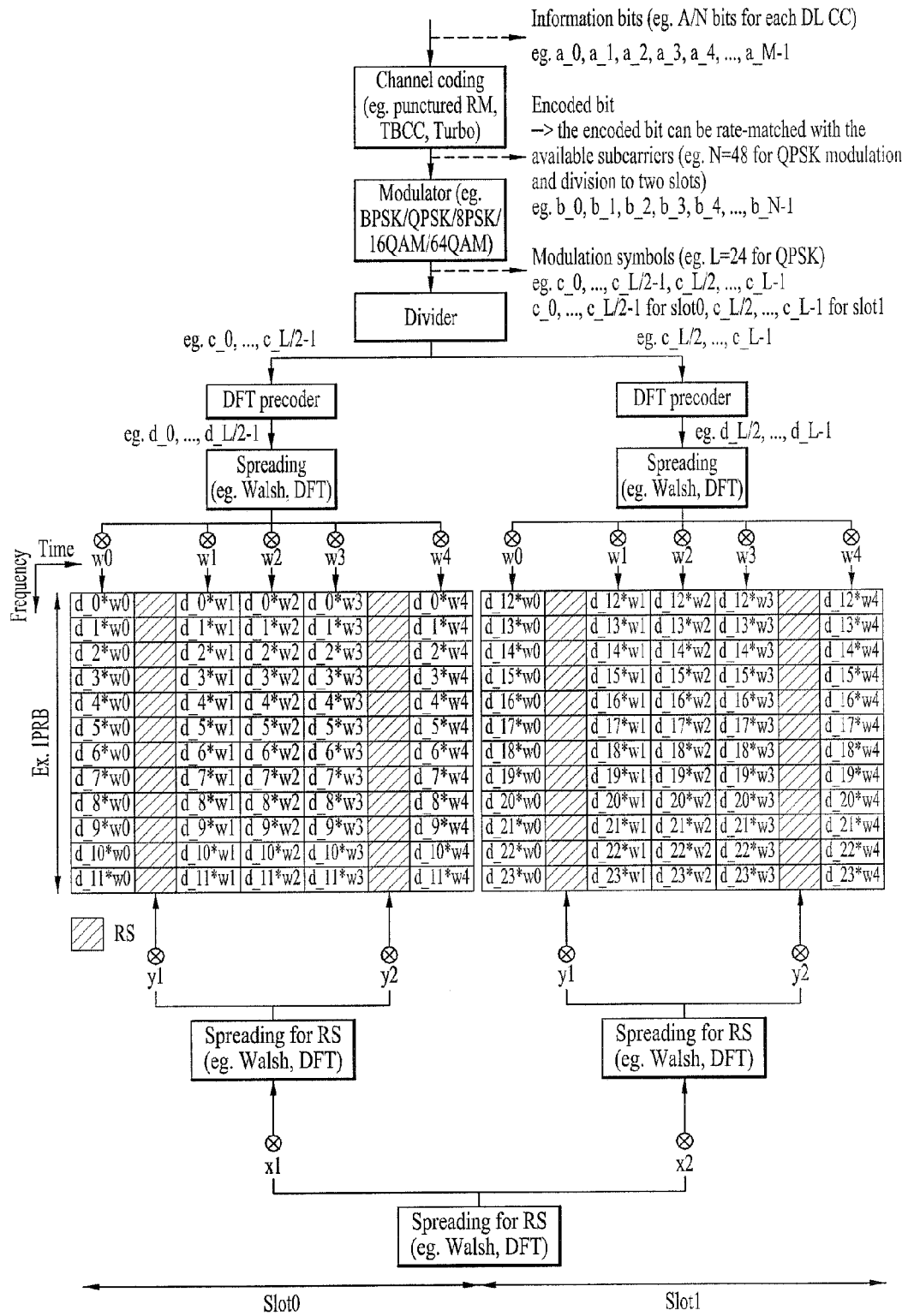

FIG. 32 illustrates an exemplary structure of PUCCH Format 3 that can increase a multiplexing capacity at a subframe level.

Without applying slot-level frequency hopping, the multiplexing capacity is doubled again by applying a Walsh cover in units of a slot. As described before, [x1 x2]=[1 1], [1 −1], or a transformation thereof may be used as an OC.

For reference, the processing operation of PUCCH Format 3 is not limited to the orders illustrated in FIGS. 29 to 32.

FIG. 33 illustrates the transmission structure of ACK/NACK information using channel selection, to which the present invention is applied. Referring to FIG. 33, two PUCCH resources or PUCCH channels (PUCCH resources #0 and #1 or PUCCH channels #0 and #1) may be configured in PUCCH Format 1b for 2-bit ACK/NACK information.

In the case of transmitting 3-bit ACK/NACK information, 2 bits of the 3-bit ACK/NACK information may be represented in PUCCH Format 1b and the other 1 bit of the 3-bit ACK/NACK information may be represented depending on which resource is selected from the two PUCCH resources. For example, since 1 bit may be indicated by selecting one of ACK/NACK information transmission using PUCCH resource #0 and ACK/NACK information transmission using PUCCH resource #1 (two cases), a total of 3 bits of ACK/NACK information may be expressed.

Table 11 illustrates an example of transmitting 3-bit ACK/NACK information by channel selection. It is assumed herein that two PUCCH resources are configured.

TABLE 11

| ACK/NACK | Ch1 RS | Ch1 Data | Ch2 RS | Ch2 Data |
|---|---|---|---|---|
| N, N, N | 1 | 1 | 0 | 0 |
| N, N, A | 1 | −j | 0 | 0 |
| N, A, N | 1 | j | 0 | 0 |
| N, A, A | 1 | −1 | 0 | 0 |
| A, N, N | 0 | 0 | 1 | 1 |
| A, N, A | 0 | 0 | 1 | −j |
| A, A, N | 0 | 0 | 1 | j |
| A, A, A | 0 | 0 | 1 | −1 |

In Table 11, 'A' denotes ACK information and 'N' denotes NACK information or NACK/DTX information. '1, −1, j, −j' are four complex modulation symbols generated through QPSK modulation of 2-bit transmission information b(0) and b(1). b(0) and b(1) are binary transmission bits transmitted using a selected PUCCH resource. For example, the binary transmission bits b(0) and b(1) may be mapped to a complex modulation symbol and transmitted through a PUCCH resource according to Table 12.

TABLE 12

| Modulation | Binary transmission bits b(0), b(1) | Complex modulation symbol |
|---|---|---|
| QPSK | 0, 0 | 1 |
|  | 0, 1 | −j |
|  | 1, 0 | j |
|  | 1, 1 | −1 |

Table 14 illustrates an example of configuring two PUCCH resources and transmitting 6 ACK/NACK states by channel selection used for TDD.

TABLE 14

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

Table 15 illustrates an example of configuring three PUCCH resources and transmitting 11 ACK/NACK states by channel selection used for TDD.

TABLE 15

| HARQ-ACK(0), HARQ-ACK(1), HARQ-ACK(2) | $n_{PUCCH}^{(1)}$ | b(0), b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 1 |
| ACK, NACK/DTX, ACK | $n_{PUCCH,0}^{(1)}$ | 1, 1 |
| ACK, NACK/DTX, NACK/DTX | $n_{PUCCH,0}^{(1)}$ | 0, 1 |
| NACK/DTX, ACK, ACK | $n_{PUCCH,2}^{(1)}$ | 1, 0 |
| NACK/DTX, ACK, NACK/DTX | $n_{PUCCH,1}^{(1)}$ | 0, 0 |
| NACK/DTX, NACK/DTX, ACK | $n_{PUCCH,2}^{(1)}$ | 0, 0 |
| DTX, DTX, NACK | $n_{PUCCH,2}^{(1)}$ | 0, 1 |
| DTX, NACK, NACK/DTX | $n_{PUCCH,1}^{(1)}$ | 1, 0 |
| NACK, NACK/DTX, NACK/DTX | $n_{PUCCH,0}^{(1)}$ | 1, 0 |
| DTX, DTX, DTX | N/A | N/A |

Table 16 illustrates an example of configuring four PUCCH resources and transmitting 20 ACK/NACK states by channel selection used for TDD.

TABLE 16

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

FIG. 34 illustrates the transmission structure of ACK/NACK information using enhanced channel selection, to which the present invention is applied. Referring to FIG. 34, two PUCCH resources (PUCCH resources #0 and #1) may be configured for PUCCH Format 1a to transmit 1-bit ACK/NACK information.

In case of transmitting 3-bit ACK/NACK information, one bit of the 3-bit ACK/NACK information may be represented in PUCCH Format 1a, another bit of the 3-bit ACK/NACK information may be represented depending on through which PUCCH resource (PUCCH resource #0 or #1) the ACK/NACK information is transmitted, and the other bit of the 3-bit ACK/NACK information may be represented depending on through which resource an RS is transmitted.

That is, 2 bits (4 cases) can be represented by selecting one of the case where ACK/NACK information is transmitted through PUCCH resource #0 and an RS is transmitted through a resource corresponding to PUCCH resource #0, the case where ACK/NACK information is transmitted through PUCCH resource #1 and an RS is transmitted through a resource corresponding to PUCCH resource #1, the case where ACK/NACK information is transmitted through PUCCH resource #0 and an RS is transmitted through a resource corresponding to PUCCH resource #1, and the case where ACK/NACK information is transmitted through PUCCH resource #1 and an RS is transmitted through a resource corresponding to PUCCH resource #0. In this manner, 3-bit ACK/NACK information may be represented.

Table 17 illustrates an example of transmitting 3-bit ACK/NACK information by enhanced channel selection. It is assumed herein that two PUCCH resources are configured.

TABLE 17

| ACK/NACK | Ch1 | | Ch2 | |
|---|---|---|---|---|
|  | RS | Data | RS | Data |
| N, N, N | 1 | 1 | 0 | 0 |
| N, N, A | 1 | −1 | 0 | 0 |
| N, A, N | 0 | 1 | 1 | 0 |
| N, A, A | 0 | −1 | 1 | 0 |
| A, N, N | 1 | 0 | 0 | 1 |
| A, N, A | 1 | 0 | 0 | −1 |
| A, A, N | 0 | 0 | 1 | 1 |
| A, A, A | 0 | 0 | 1 | −1 |

Compared to Table 11 using channel selection, Table 17 using enhanced channel selection is meaningful in that BPSK modulated complex symbols may be mapped to PUCCH resources.

Meanwhile, the corresponding PUCCH resources may be explicitly allocated to a specific UE through RRC signaling. In addition, the same PUCCH resource may be allocated to a plurality of UEs in order to effectively manage resource allocation and a network may indicate a specific PUCCH resource value in DCI. At this time, the specific value in the DCI may be transmitted using a Transmit Power Control (TPC) command field. Especially, the specific value may use a TPC command field in DCI transmitted on an SCC. In this manner, a value of a TPC command field in DCI transmitted on a PCC is maintained so as to be used for power control and a value of the TPC command field transmitted on the SCC, corresponding to that transmitted on the PCC, is replaced with the specific value, for transmission. Consequently, resource allocation may be applied without additional change of a DCI format.

Alternatively, the network may indicate PUCCH resources which can be shared between a plurality of UEs in advance and transmit DCI including a specific indicator for a detailed PUCCH resource to a specific UE.

In the case of transmitting X-bit ACK/NACK information using channel selection, if at least one PDCCH is detected only on a downlink PCC, a PUCCH resource for transmitting ACK/NACK information may be derived through the lowest of CCE indexes used for a transmitted PDCCH. That is, a PUCCH resource index may be recognized using an equation of $n^{(1)}_{PUCCH} = n_{CCE} + N^{(1)}_{PUCCH}$. This may be called an implicit scheme.

In case of transmitting Y-bit ACK/NACK information using a DFT-s-OFDM format, if at least one PDCCH is detected only on the downlink PCC, a corresponding PUCCH resource may be recognized using the above equation. This may be called a dynamic resource allocation scheme in that the PUCCH resource is determined through the lowest of CCE indexes used for a received PDCCH, i.e. the PUCCH resource is variable according to a CCE index value.

Meanwhile, even if cross-carrier scheduling is performed (i.e. if a Carrier Indication Field (CIF) is configured), at least one PDCCH may be transmitted only on the downlink PCC. For example, cross-carrier scheduling in which five PDCCHs corresponding to PDSCHs for five downlink CCs are transmitted only on the downlink PCC may be performed. In this case, ACK/NACK information may be transmitted using enhanced channel selection or the DFR-s-OFDM format. Cross-carrier schedule refers to a scheme of allocating a resource of a PDSCH transmitted on a specific CC through a PDCCH transmitted on another CC. In a system supporting cross-carrier scheduling, a CIF indicating a DL CC/UL CC on which a PDSCH/PUSCH is transmitted is included in a PDCCH.

Hereinbelow, a transmit diversity scheme according to a first embodiment of the present invention will be described. This scheme may be called Spatial Orthogonal Resource Transmit Diversity (SORTD). SORTD is a transmit diversity scheme for transmitting the same information through each antenna using twice the resources used in a single antenna.

For example, if ACK/NACK information (b0, b1, b2, and b3) is transmitted using one of four PUCCH resources (n0, n1, n2, and n3) in a single antenna, up to 8 PUCCH resources (n0, n1, n2, n3, n4, n5, n6, and n7) may be used in SORTD, wherein the ACK/NACK information (b0, b1, b2, and b3) may be transmitted using one of four PUCCH resources (n0, n1, n2, and n3) in a first antenna and the ACK/NACK information (b0, b1, b2, and b3) may be transmitted using one of the other four PUCCH resources (n4, n5, n6, and n7) in a second antenna.

If the PDCCH is transmitted only on the downlink PCC, a PUCCH resource for transmitting corresponding ACK/NACK information may be implicitly allocated. As mentioned with reference to FIG. 12, the PUCCH resource for transmitting the corresponding ACK/NACK information may be recognized using $n_{CCE}$ which is the lowest of CCE indexes used for transmission of the PDCCH of DCI (e.g. a DL grant).

Meanwhile, examples of transmitting up to 4-bit ACK/NACK information using channel selection are as follows.

(1) Transmission of 2-bit ACK/NACK Information
Transmission of 1-bit ACK/NACK information corresponding to DL CC #0 and 1-bit ACK/NACK information corresponding to DL CC #1

(2) Transmission of 3-bit ACK/NACK Information
Transmission of 2-bit ACK/NACK information corresponding to DL CC #0 and 1-bit ACK/NACK information corresponding to DL CC #1 (or transmission of 1-bit ACK/NACK information corresponding to DL CC #0 and 2-bit ACK/NACK information corresponding to DL CC #1)
Transmission of 1-bit ACK/NACK information corresponding to DL CC #0, 1-bit ACK/NACK information corresponding to DL CC #1, and 1-bit ACK/NACK information corresponding to DL CC #2

(3) Transmission of 4-bit ACK/NACK Information
Transmission of 2-bit ACK/NACK information corresponding to DL CC #0 and 2-bit ACK/NACK information corresponding to DL CC #1
Transmission of 1-bit ACK/NACK information corresponding to DL CC #0, 1-bit ACK/NACK information corresponding to DL CC #1, 1-bit ACK/NACK information corresponding to DL CC #2, and 1-bit ACK/NACK information corresponding to DL CC #3
Transmission of 2-bit ACK/NACK information corresponding to DL CC #0, 1-bit ACK/NACK information corresponding to DL CC #1, and 1-bit ACK/NACK information corresponding to DL CC #2 (or other combinations)

For example, in the case of transmission of 4-bit ACK/NACK information (2-bit ACK/NACK information corresponding to DL CC #0 and 2-bit ACK/NACK information corresponding to DL CC #1), if it is assumed that two PDCCHs (i.e. PDCCH #0 and PDCCH #1) are transmitted and the two PDCCHs are all transmitted on a downlink PCC, two PUCCH resources may be implicitly recognized. This may be confirmed using $n_{CCE}$ for each PDCCH. In order to transmit the 4-bit ACK/NACK information using channel selection, since four PUCCH resources are needed, the other two PUCCH resources may be recognized as follows.

PUCCH resource #0 is recognized from $n_{CCE}$ 0 of PDCCH #0

PUCCH resource #1 is recognized from $n_{CCE}$ 1 of PDCCH #1

PUCCH resource #2 is recognized from $n_{CCE}$ 0+1

PUCCH resource #3 is recognized from $n_{CCE}$ 1+1

The same principle is applied to the case in which a PDCCH is transmitted on each DL CC and to the case in which cross-carrier scheduling is used. For instance, the same principle may be applied to the case in which all PDCCHs are transmitted on one DL CC (e.g. a downlink PCC).

Table 18 illustrates an example of transmitting 2-bit ACK/NACK information using channel selection in a single antenna.

TABLE 18

|  | Ch1 | | Ch2 | |
| --- | --- | --- | --- | --- |
|  | RS | Data | RS | Data |
| N, N | 1 | 1 | 0 | 0 |
| A, N | 1 | −1 | 0 | 0 |
| N, A | 0 | 0 | 1 | 1 |
| A, A | 0 | 0 | 1 | −1 |

Table 19 illustrates an example of transmitting 2-bit ACK/NACK information using channel selection to which SORTD is applied.

TABLE 19

|  | Antenna 0 | | | | Antenna 1 | | | |
| --- | --- | --- | --- | --- | --- | --- | --- | --- |
|  | Ch1 | | Ch2 | | Ch3 | | Ch4 | |
|  | RS | Data | RS | Data | RS | Data | RS | Data |
| N, N | 1 | 1 | 0 | 0 | 1 | 1 | 0 | 0 |
| A, N | 1 | −1 | 0 | 0 | 1 | −1 | 0 | 0 |
| N, A | 0 | 0 | 1 | 1 | 0 | 0 | 1 | 1 |
| A, A | 0 | 0 | 1 | −1 | 0 | 0 | 1 | −1 |

Table 20 illustrates an example of transmitting 3-bit ACK/NACK information using channel selection to which SORTD is applied.

TABLE 20

|  | Antenna 0 | | | | | |
| --- | --- | --- | --- | --- | --- | --- |
|  | Ch1 | | Ch2 | | Ch3 | |
|  | RS | DATA | RS | DATA | RS | DATA |
| N, N, N | 1 | 1 | 0 | 0 | 0 | 0 |
| N, N, A | 1 | −j | 0 | 0 | 0 | 0 |
| N, A, N | 1 | j | 0 | 0 | 0 | 0 |
| N, A, A | 0 | 0 | 0 | 0 | 1 | 1 |
| A, N, N | 0 | 0 | 1 | 1 | 0 | 0 |
| A, N, A | 0 | 0 | 1 | −j | 0 | 0 |
| A, A, N | 0 | 0 | 1 | j | 0 | 0 |
| A, A, A | 0 | 0 | 0 | 0 | 1 | −1 |

TABLE 20-continued

| | Antenna 1 | | | | | |
|---|---|---|---|---|---|---|
| | Ch4 | | Ch5 | | Ch6 | |
| | RS | DATA | RS | DATA | RS | DATA |
| N, N, N | 1 | 1 | 0 | 0 | 0 | 0 |
| N, N, A | 1 | −j | 0 | 0 | 0 | 0 |
| N, A, N | 1 | j | 0 | 0 | 0 | 0 |
| N, A, A | 0 | 0 | 0 | 0 | 1 | 1 |
| A, N, N | 0 | 0 | 1 | 1 | 0 | 0 |
| A, N, A | 0 | 0 | 1 | −j | 0 | 0 |
| A, A, N | 0 | 0 | 1 | j | 0 | 0 |
| A, A, A | 0 | 0 | 0 | 0 | 1 | −1 |

Next, a transmit diversity scheme according to a second embodiment of the present invention will be described. This scheme may be called Space-Code Block Coding (SCBC). SCBC is a scheme for achieving spatial diversity using the same number of resources as the number of resources used in a single antenna. In order to transmit an RS symbol for estimating a channel of each antenna, as many RS resources are needed as the number of antennas. In the case of 2Tx using two antennas, two RS resources are transmitted via the respective antennas in SORTD. For transmission of a data symbol, transmit diversity may be achieved by the same number of resources as the number of PUCCH resources used for transmission through a single antenna, when the number of PUCCH resources used for channel selection is an even number.

Channel selection to which SCBC is applied will now be described. In SCBC, Alamouti coding is applied to a code resource domain (or a channel resource domain) and an antenna domain. For convenience of description, it is assumed that the number of transmit antennas is 2 (i.e. 2Tx of antenna #0 and antenna #1). Two RS resources (RS resource #0 and RS resource #1) among RS resources may be used for channel estimation for the respective antennas. In other words, in order to estimate a channel for each antenna, an RS symbol may be transmitted using a first antenna through RS resource #0 and using a second antenna through RS resource #1. Meanwhile, while a description will be given focusing upon slot 0, it is apparent that the present invention is identically applied to slot 1.

When Alamouti coding is applied, a modulation symbol transmitted through antenna 0 is transmitted in the same manner as the case of transmission through a single antenna (1Tx) and a modulation symbol transmitted through antenna 1 is transmitted by applying Alamouti coding to the modulation symbol transmitted through antenna 0. Alamouti coding includes not only the following Equation 3 but also a unitary transformation form thereof.

$$\text{Orthogonal resource domain} \left[ \begin{pmatrix} s_0 & -(s_1)^* \\ s_1 & (s_0)^* \end{pmatrix} \right. \xrightarrow{\text{antenna}} \quad \text{[Equation 3]}$$

In Equation 3, $(.)^*$ denotes a complex conjugate of $(.)$ and an orthogonal resource domain may mean a code resource domain or a channel resource domain.

In channel selection to which SCBC is applied, only one of a plurality of channel resources is selected in a single antenna. For convenience, if a modulation symbol transmitted on channel resource #1 is referred to as s1 and a modulation symbol transmitted on channel resource #2 is referred to as s2, since either channel resource #1 or channel resource #2 is used for transmission according to channel selection, both s1 and s2 cannot be simultaneously transmitted. Accordingly, one of s1 and s2 is necessarily 0 and Equation 3 may be modified into Equation 4.

$$\text{Resource} \left[ \begin{pmatrix} s_1 & 0 \\ 0 & s_1^* \end{pmatrix} \right., \text{ when } s_2 = 0 \quad \text{[Equation 4]}$$

$$\text{Resource} \left[ \begin{pmatrix} 0 & -s_2^* \\ s_2 & 0 \end{pmatrix} \right., \text{ when } s_1 = 0$$

(Antenna (physical or logical))

For example, if s2=0 under the assumption of PUCCH resources #0 and #1,

Antenna 0 s1 is transmitted through PUCCH resource #0

0 (=s2) is transmitted through PUCCH resource #1

Antenna 1

0 (=−(s2)*) is transmitted through PUCCH resource #0

(s1)* is transmitted through PUCCH resource #1

Paired PUCCH resources (or channels) to which SCBC is applied may be present in the same PRB due to performance etc. For example, when 4-bit ACK/NACK information (2-bit ACK/NACK information corresponding to DL CC #0 and ACK/NACK information corresponding to DL CC #1) is transmitted, if the number of transmitted PDCCHs is two (i.e. PDCCH #0 and PDCCH #1), PUCCH resources can be identified using $n_{CCE}$ for each of the PDCCHs. That is, two PUCCH resources (PUCCH resource #0 and PUCCH resource #1) may be recognized by $n_{CCE}$ 0 of PDCCH #0 and $n_{CCE}$ 1 of PDCCH #1. PUCCH resource #2 paired with PUCCH resource #0 may be recognized by $n_{CCE}$ 0+1 and PUCCH resource #3 paired with PUCCH resource #1 may be recognized by $n_{CCE}$ 1+1.

Table 21 illustrates an example of transmitting 2-bit ACK/NACK information using channel selection to which SCBC is applied. It is assumed that RS symbols are transmitted through two RS resources using respective antennas.

TABLE 21

| | Antenna 0 | | | | Antenna 1 | | | |
|---|---|---|---|---|---|---|---|---|
| | Ch1 | | Ch2 | | Ch 1 | | Ch2 | |
| | RS | Data | RS | Data | RS | Data | RS | Data |
| N, N | 1 | 1 | 0 | 0 | 0 | 0 | 1 | 1 |
| A, N | 1 | −1 | 0 | 0 | 0 | 0 | 1 | −1 |
| N, A | 1 | 0 | 0 | 1 | 0 | −1 | 1 | 0 |
| A, A | 1 | 0 | 0 | −1 | 0 | 1 | 1 | 0 |

Table 22 illustrates an example of transmitting 4-bit ACK/NACK information using channel selection in a single antenna.

TABLE 22

| | Ch1 | | Ch2 | | Ch3 | | Ch4 | |
|---|---|---|---|---|---|---|---|---|
| | RS | DATA | RS | DATA | RS | DATA | RS | DATA |
| N, N, N, N | 1 | 1 | 0 | 0 | 0 | 0 | 0 | 0 |
| N, N, N, A | 1 | -j | 0 | 0 | 0 | 0 | 0 | 0 |
| N, N, A, N | 1 | j | 0 | 0 | 0 | 0 | 0 | 0 |
| N, N, A, A | 1 | -1 | 0 | 0 | 0 | 0 | 0 | 0 |
| N, A, N, N | 0 | 0 | 1 | 1 | 0 | 0 | 0 | 0 |
| N, A, N, A | 0 | 0 | 1 | -j | 0 | 0 | 0 | 0 |
| N, A, A, N | 0 | 0 | 1 | j | 0 | 0 | 0 | 0 |
| N, A, A, A | 0 | 0 | 1 | -1 | 0 | 0 | 0 | 0 |
| A, N, N, N | 0 | 0 | 0 | 0 | 1 | 1 | 0 | 0 |
| A, N, N, A | 0 | 0 | 0 | 0 | 1 | -j | 0 | 0 |
| A, N, A, N | 0 | 0 | 0 | 0 | 1 | j | 0 | 0 |
| A, N, A, A | 0 | 0 | 0 | 0 | 1 | -1 | 0 | 0 |
| A, A, N, N | 0 | 0 | 0 | 0 | 0 | 0 | 1 | 1 |
| A, A, N, A | 0 | 0 | 0 | 0 | 0 | 0 | 1 | -j |
| A, A, A, N | 0 | 0 | 0 | 0 | 0 | 0 | 1 | j |
| A, A, A, A | 0 | 0 | 0 | 0 | 0 | 0 | 1 | -1 |

Table 23 illustrates an example of transmitting 4-bit ACK/NACK information using channel selection to which SCBC is applied. Alamouti coding is applied by a combination of PUCCH resource #1 and PUCCH resource #2 and Alamouti coding is applied by a combination of PUCCH resource #3 and PUCCH resource #4. It is assumed that RS symbols are transmitted through two RS resources (PUCCH resource #1 and PUCCH resource #2) for channel estimation using respective antennas. Alamouti coding is applied in pairs each of two PUCCH resources.

TABLE 23

| | Antenna 0 | | | | | | | |
|---|---|---|---|---|---|---|---|---|
| | Ch1 | | Ch2 | | Ch3 | | Ch4 | |
| | RS | DATA | RS | DATA | RS | DATA | RS | DATA |
| N, N, N, N | 1 | 1 | 0 | 0 | 0 | 0 | 0 | 0 |
| N, N, N, A | 1 | -j | 0 | 0 | 0 | 0 | 0 | 0 |
| N, N, A, N | 1 | j | 0 | 0 | 0 | 0 | 0 | 0 |
| N, N, A, A | 1 | -1 | 0 | 0 | 0 | 0 | 0 | 0 |
| N, A, N, N | 1 | 0 | 0 | 1 | 0 | 0 | 0 | 0 |
| N, A, N, A | 1 | 0 | 0 | -j | 0 | 0 | 0 | 0 |
| N, A, A, N | 1 | 0 | 0 | j | 0 | 0 | 0 | 0 |
| N, A, A, A | 1 | 0 | 0 | -1 | 0 | 0 | 0 | 0 |
| A, N, N, N | 1 | 0 | 0 | 0 | 0 | 1 | 0 | 0 |
| A, N, N, A | 1 | 0 | 0 | 0 | 0 | -j | 0 | 0 |
| A, N, A, N | 1 | 0 | 0 | 0 | 0 | j | 0 | 0 |
| A, N, A, A | 1 | 0 | 0 | 0 | 0 | -1 | 0 | 0 |
| A, A, N, N | 1 | 0 | 0 | 0 | 0 | 0 | 0 | 1 |
| A, A, N, A | 1 | 0 | 0 | 0 | 0 | 0 | 0 | -j |
| A, A, A, N | 1 | 0 | 0 | 0 | 0 | 0 | 0 | j |
| A, A, A, A | 1 | 0 | 0 | 0 | 0 | 0 | 0 | -1 |

| | Antenna 1 | | | | | | | |
|---|---|---|---|---|---|---|---|---|
| | Ch1 | | Ch2 | | Ch3 | | Ch4 | |
| | RS | DATA | RS | DATA | RS | DATA | RS | DATA |
| N, N, N, N | 0 | 0 | 1 | 1 | 0 | 0 | 0 | 0 |
| N, N, N, A | 0 | 0 | 1 | j | 0 | 0 | 0 | 0 |
| N, N, A, N | 0 | 0 | 1 | -j | 0 | 0 | 0 | 0 |
| N, N, A, A | 0 | 0 | 1 | -1 | 0 | 0 | 0 | 0 |
| N, A, N, N | 0 | -1 | 1 | 0 | 0 | 0 | 0 | 0 |
| N, A, N, A | 0 | -j | 1 | 0 | 0 | 0 | 0 | 0 |
| N, A, A, N | 0 | j | 1 | 0 | 0 | 0 | 0 | 0 |
| N, A, A, A | 0 | 1 | 1 | 0 | 0 | 0 | 0 | 0 |
| A, N, N, N | 0 | 0 | 1 | 0 | 0 | 0 | 0 | 1 |
| A, N, N, A | 0 | 0 | 1 | 0 | 0 | 0 | 0 | j |
| A, N, A, N | 0 | 0 | 1 | 0 | 0 | 0 | 0 | -j |
| A, N, A, A | 0 | 0 | 1 | 0 | 0 | 0 | 0 | -1 |
| A, A, N, N | 0 | 0 | 1 | 0 | 0 | -1 | 0 | 0 |
| A, A, N, A | 0 | 0 | 1 | 0 | 0 | -j | 0 | 0 |
| A, A, A, N | 0 | 0 | 1 | 0 | 0 | j | 0 | 0 |
| A, A, A, A | 0 | 0 | 1 | 0 | 0 | 1 | 0 | 0 |

Meanwhile, while SORTD needs twice the resources relative to transmission through a single antenna, SCBC does not increase the number of resources relative to transmission through a single antenna. If it is assumed that there is no erroneous channel estimation, theoretical spatial diversity gain is the same in SORTD and in SCBC. However, SCBC may generate an orphan resource when the number of resources is an odd number during transmission through a single antenna.

A transmit diversity scheme, which may be called a hybrid of SCBC and SORTD, according to a third embodiment of the present invention will be described. More specifically, a hybrid of SCBC and SORTD is a scheme of pairing resources (PUCCH resources) using SCBC and applying SORTD to one remaining resource. Since SORTD is applied only to a remaining resource, i.e. an orphan resource, the total number of necessary resources is larger by one than the number of resources used in a single antenna. For a total of four PUCCH resources (or channels), SCBC may be applied to a pair of PUCCH resource #0 (channel 1) and PUCCH resource #1 (channel 2) and SORTD may be applied to PUCCH resource #2 (channel 3) and PUCCH resource #3 (channel 4).

Table 24 illustrates an example of transmitting 3-bit ACK/NACK information using channel selection to which a hybrid of SCBC and SORTD is applied. RS symbols are transmitted through channel 1 and channel 2 and used for channel estimation of respective antennas. For data symbols, SCBC is applied to a pair of channel 1 and channel 2 and SORTD is applied to a pair of channel 3 and channel 4. The channels 1, 2, and 3 may be implicitly recognized through a PDCCH and the channel 4 may be explicitly recognized through an RRC signal.

TABLE 24

| | Antenna 0 | | | | | |
|---|---|---|---|---|---|---|
| | Ch1 | | Ch2 | | Ch3 | |
| | RS | DATA | RS | DATA | RS | DATA |
| N, N, N | 1 | 1 | 0 | 0 | 0 | 0 |
| N, N, A | 1 | -j | 0 | 0 | 0 | 0 |
| N, A, N | 1 | j | 0 | 0 | 0 | 0 |
| N, A, A | 1 | 0 | 0 | 0 | 0 | 1 |
| A, N, N | 1 | 0 | 0 | 1 | 0 | 0 |
| A, N, A | 1 | 0 | 0 | -j | 0 | 0 |
| A, A, N | 1 | 0 | 0 | j | 0 | 0 |
| A, A, A | 1 | 0 | 0 | 0 | 0 | -1 |

| | Antenna 1 | | | | | |
|---|---|---|---|---|---|---|
| | Ch1 | | Ch2 | | Ch4 | |
| | RS | DATA | RS | DATA | RS | DATA |
| N, N, N | 0 | 0 | 1 | 1 | 0 | 0 |
| N, N, A | 0 | 0 | 1 | j | 0 | 0 |
| N, A, N | 0 | 0 | 1 | -j | 0 | 0 |
| N, A, A | 0 | 0 | 1 | 0 | 0 | 1 |
| A, N, N | 0 | -1 | 1 | 0 | 0 | 0 |
| A, N, A | 0 | -j | 1 | 0 | 0 | 0 |
| A, A, N | 0 | j | 1 | 0 | 0 | 0 |
| A, A, A | 0 | 0 | 1 | 0 | 0 | -1 |

TABLE 23-continued

| A, A, N, A | 0 | 0 | 1 | 0 | 0 | -j | 0 | 0 |
|---|---|---|---|---|---|---|---|---|
| A, A, A, N | 0 | 0 | 1 | 0 | 0 | j | 0 | 0 |
| A, A, A, A | 0 | 0 | 1 | 0 | 0 | 1 | 0 | 0 |

A transmit diversity scheme, which may be called a hybrid of SCBC and SCBC, will now be described according to fourth embodiment of the present invention. This embodiment will be described on the premise that the number of resources (PUCCH resources) is determined according to number of downlink data (or the number of ACKs/NACKs). More specifically, a hybrid of SCBC and SCBC is a scheme of pairing PUCCH resources based on SCBC, additionally allocating a PUCCH resource except for the already allocated PUCCH resources to a remaining one PUCCH resource, and applying SCBC to the remaining one PUCCH resource and the additionally allocated PUCCH resource. In a hybrid of SCBC and SCBC, since one PUCCH resource is additionally allocated to configure paired PUCCH resources, the total number of PUCCH resources is larger by one than the number of PUCCH resources used in a single antenna.

For example, when 3-bit ACK/NACK information is transmitted using channel selection in a single antenna, three PUCCH resources are allocated. In this case, one PUCCH resource may be additionally allocated for a hybrid of SCBC and SCBC and SCBC may be applied to two paired PUCCH resources, i.e. a total of four PUCCH resources. In the case of configuration of two downlink CCs (DL CC #0 and DL CC #1), the additionally allocated PUCCH resource may be recognized through an implicit scheme of $n_{CCE}$ 0, $n_{CCE}$ 0+1, $n_{CCE}$ 1, and $n_{CCE}$ 1+1 based on a transmitted PDCCH or through an explicit scheme of an RRC signal.

For a total of four PUCCH resources (or channels), SCBC may be applied to a pair of PUCCH resource #0 and PUCCH resource #1 and to a pair of PUCCH resource #1 and PUCCH resource #3.

Table 25 illustrates an example of transmitting 3-bit ACK/NACK information using channel selection to which a hybrid of SCBC and SCC is applied. SCBC is applied to a pair of channel 1 and channel 2 and to a pair of channel 3 and channel 4. Channel 4 indicates a PUCCH resource additionally allocated for SCBC. RS symbols are used for channel estimation of respective antennas through channel 1 and channel 2.

TABLE 25

| | Antenna 0 | | | | | | | |
|---|---|---|---|---|---|---|---|---|
| | Ch1 | | Ch2 | | Ch3 | | Ch4 | |
| | RS | DATA | RS | DATA | RS | DATA | RS | DATA |
| N, N, N | 1 | 1 | 0 | 0 | 0 | 0 | 0 | 0 |
| N, N, A | 1 | -j | 0 | 0 | 0 | 0 | 0 | 0 |
| N, A, N | 1 | j | 0 | 0 | 0 | 0 | 0 | 0 |
| N, A, A | 1 | 0 | 0 | 0 | 0 | 1 | 0 | 0 |
| A, N, N | 1 | 0 | 0 | 1 | 0 | 0 | 0 | 0 |
| A, N, A | 1 | 0 | 0 | -j | 0 | 0 | 0 | 0 |
| A, A, N | 1 | 0 | 0 | j | 0 | 0 | 0 | 0 |
| A, A, A | 1 | 0 | 0 | 0 | 0 | -1 | 0 | 0 |

| | Antenna 1 | | | | | | | |
|---|---|---|---|---|---|---|---|---|
| | Ch1 | | Ch2 | | Ch3 | | Ch4 | |
| | RS | DATA | RS | DATA | RS | DATA | RS | DATA |
| N, N, N | 0 | 0 | 1 | 1 | 0 | 0 | 0 | 0 |
| N, N, A | 0 | 0 | 1 | j | 0 | 0 | 0 | 0 |
| N, A, N | 0 | 0 | 1 | -j | 0 | 0 | 0 | 0 |
| N, A, A | 0 | 0 | 1 | 0 | 0 | 0 | 0 | 1 |
| A, N, N | 0 | -1 | 1 | 0 | 0 | 0 | 0 | 0 |
| A, N, A | 0 | -j | 1 | 0 | 0 | 0 | 0 | 0 |
| A, A, N | 0 | j | 1 | 0 | 0 | 0 | 0 | 0 |
| A, A, A | 0 | 0 | 1 | 0 | 0 | 0 | 0 | -1 |

A transmit diversity scheme according to a fifth embodiment of the present invention will now be described. In this embodiment, resources are paired based on SCBC and a Single Antenna Port (SAP) mode is applied to a remaining orphan resource, when the number of resources used for transmission through a single antenna is an odd number. The SAP mode is a method for causing a receiving end to recognize transmission as transmission through a single antenna by transmitting resources through a substantial single antenna or applying antenna virtualization such as Cyclic Delay Diversity (CDD) or Precoding Vector Switching (PVS). Then transmit diversity can be supported while the number of resources used in a single antenna is maintained. In the case of configuration of two downlink CCs (DL CC #0 and DL CC #1), the PUCCH resources may be recognized through an implicit scheme of $n_{CCE}$ 0, $n_{CCE}$ 0+1 and nCCE 1 (or $n_{CCE}$ 0, $n_{CCE}$ 1 and $n_{CCE}$ 1+1) based on a transmitted PDCCH or through an explicit scheme of an RRC signal.

Table 26 illustrates an example of transmitting 3-bit ACK/NACK information using channel selection to which SCBC and the SAP mode are applied. Specifically, SCBC is applied to channels 1 and 2 and the SAP mode is applied to channel 3. RS symbols are used for channel estimation of respective antennas through channel 1 and channel 2 and a total of three PUCCH resources is used.

TABLE 26

| | Antenna 0 | | | | | |
|---|---|---|---|---|---|---|
| | Ch1 | | Ch2 | | Ch3 | |
| | RS | DATA | RS | DATA | RS | DATA |
| N, N, N | 1 | 1 | 0 | 0 | 0 | 0 |
| N, N, A | 1 | -j | 0 | 0 | 0 | 0 |
| N, A, N | 1 | j | 0 | 0 | 0 | 0 |
| N, A, A | 1 | 0 | 0 | 0 | 0 | 1 |
| A, N, N | 1 | 0 | 0 | 1 | 0 | 0 |
| A, N, A | 1 | 0 | 0 | -j | 0 | 0 |
| A, A, N | 1 | 0 | 0 | j | 0 | 0 |
| A, A, A | 1 | 0 | 0 | 0 | 0 | -1 |

| | Antenna 1 | | | | | |
|---|---|---|---|---|---|---|
| | Ch1 | | Ch2 | | Ch3 | |
| | RS | DATA | RS | DATA | RS | DATA |
| N, N, N | 0 | 0 | 1 | 1 | 0 | 0 |
| N, N, A | 0 | 0 | 1 | j | 0 | 0 |
| N, A, N | 0 | 0 | 1 | -j | 0 | 0 |
| N, A, A | 0 | 0 | 1 | 0 | 0 | 1 |
| A, N, N | 0 | -1 | 1 | 0 | 0 | 0 |
| A, N, A | 0 | -j | 1 | 0 | 0 | 0 |
| A, A, N | 0 | j | 1 | 0 | 0 | 0 |
| A, A, A | 0 | 0 | 1 | 0 | 0 | -1 |

Figure 35:
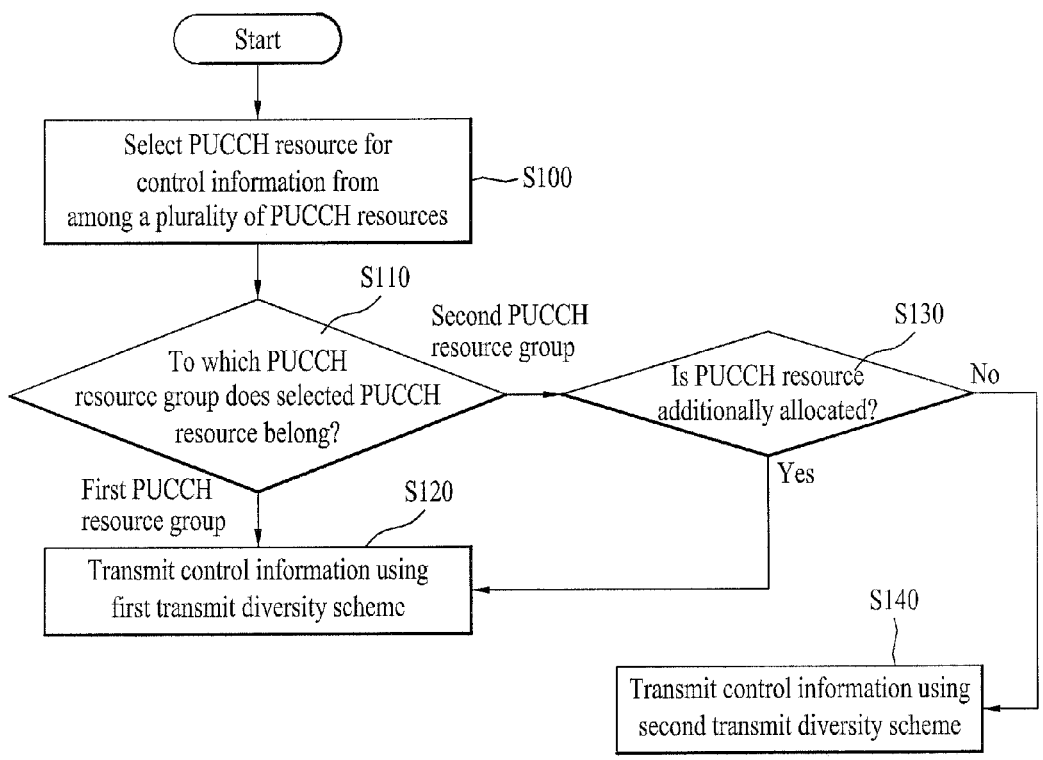
FIG. 35 is a block diagram illustrating application of transmit diversity schemes according to an exemplary embodiment of the present invention.

FIG. 35 is a block diagram illustrating application of transmit diversity schemes according to an exemplary embodiment of the present invention.

A UE selects a PUCCH resource for control information from among a plurality of PUCCH resources (step S100). The selected PUCCH resource may belong to a first PUCCH resource group in which PUCCH resources are paired or a second resource group in which PUCCH resources are not paired.

If the selected PUCCH resource belongs to the first PUCCH resource group (step S110), corresponding control information is transmitted through a plurality of antenna ports using a first transmit diversity scheme (in step S120). If the selected PUCCH resource belongs to the second PUCCH resource group (in step S110), corresponding control information is transmitted through a plurality of antenna ports using a second transmit diversity scheme (step S140). The first diversity scheme may correspond to SCBC and the second transmit diversity scheme may correspond to SORTD or an SAP mode.

Meanwhile, if the selected PUCCH resource belongs to the second PUCCH resource group (in step S110), one PUCCH resource may be additionally allocated (step S130) and corresponding control information may be transmitted using the first diversity scheme (step S120). Alternatively, corresponding control information may be transmitted using the second diversity scheme (S140) without additional allocation of one PUCCH resource (S130).

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is mainly given, centering on a data transmission and reception relationship among a BS and a UE. Such a data transmission and reception relationship is extended to data transmission and reception between a UE and a relay or between a BS and a relay in the same or similar manner. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS.

The term 'BS' may be replaced with the terms fixed station, Node B, eNode B (eNB), access point, etc. The term 'UE' may be replaced with the terms MS, Mobile Subscriber Station (MSS), etc. The term 'relay' may be replaced with the terms Relay Node (RN), relay station, repeater, etc.

The embodiments of the present invention may be achieved by various means, for example, hardware, firmware, software, or a combination thereof. In a hardware configuration, an embodiment of the present invention may be achieved by one or more ASICs, DSPs, DSDPs, PLDs, FPGAs, processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention is applicable to a UE, a BS, or any other equipment in a wireless communication system and, more particularly, to a method and apparatus for transmitting control information.

The invention claimed is:

1. A method for a user equipment (UE) to transmit control information in a wireless communication system, the method comprising:
    selecting a physical uplink control channel (PUCCH) resource for the control information from among a plurality of PUCCH resources; and
    transmitting a modulation value corresponding to the control information through a plurality of antenna ports using the selected PUCCH resource,
    wherein the plurality of PUCCH resources are divided into a first PUCCH resource group which includes one or more pairs of PUCCH resources, each pair of which is comprised of two PUCCH resources recognized respectively by $n_{CCE}$ and $n_{CCE}+1$, where $n_{CCE}$ is an index of a lowest control channel element (CCE) of a physical downlink shared channel (PDCCH) detected by the UE and a second PUCCH resource group which includes one or more PUCCH resources other than PUCCH resources belonging to the first PUCCH resource group,
    wherein the control information is transmitted using a first transmit diversity scheme when the selected PUCCH resource belongs to the first PUCCH resource group, and the control information is transmitted using a second transmit diversity scheme when the selected PUCCH resource belongs to the second PUCCH resource group, and
    wherein the first transmit diversity scheme is space-code block coding (SCBC).

2. The method of claim 1, wherein the second transmit diversity scheme is spatial orthogonal resource transmit diversity (SORTD).

3. The method of claim 1, wherein the second transmit diversity scheme is a single antenna port (SAP) mode.

4. The method of claim 1, wherein the plurality of PUCCH resources is odd in number.

5. An apparatus for transmitting control information in a wireless communication system, comprising:
    a transmitter including a plurality of antennas; and
    a processor for selecting a physical uplink control channel (PUCCH) resource for the control information from among a plurality of PUCCH resources, and transmitting a modulation value corresponding to the control information through a plurality of antenna ports using the selected PUCCH resource by controlling the transmitter,
    wherein the plurality of PUCCH resources are divided into a first PUCCH resource group which includes one more pairs of PUCCH resources, each pair of which is comprised of two PUCCH resources recognized respectively by $n_{CCE}$ and $n_{CCE}+1$, where $n_{CCE}$ is an index of a lowest control channel element (CCE) of a physical downlink shared channel (PDCCH) detected by the processor and a second PUCCH resource group which includes one or more PUCCH resources other than PUCCH resources belonging to the first PUCCH resource group, and wherein the control information is transmitted using a first transmit diversity scheme when the selected PUCCH resource belongs to the first PUCCH resource group, and the control information is transmitted using a second transmit diversity scheme when the selected PUCCH resource belongs to the second PUCCH resource group, and wherein the first transmit diversity scheme is space-code block coding (SCBC).

6. The apparatus of claim 5, wherein the the second transmit diversity scheme is spatial orthogonal resource transmit diversity (SORTD).

7. The apparatus of claim 5, wherein the second transmit diversity scheme is a single antenna port (SAP) mode.

8. The apparatus of claim 5, wherein the plurality of PUCCH resources is odd in number.

9. The method of claim 4, wherein transmitting the control information using the second transmit diversity scheme comprises:

allocating another PUCCH resource to be paired with the selected PUCCH resource when the selected PUCCH resource belongs to the second PUCCH resource group; and transmitting the control information using the selected PUCCH resource, the another PUCCH resource and the SCBC.

10. The apparatus of claim 8, wherein the processor is configured to allocate another PUCCH resource to be paired with the selected PUCCH resource when the selected PUCCH resource belongs to the second PUCCH resource group and control the transmitter to transmit the control information using the selected PUCCH resource, the another PUCCH resource and the SCBC.

* * * * *